US012545709B2

(12) United States Patent
Dallmeier et al.

(10) Patent No.: US 12,545,709 B2
(45) Date of Patent: Feb. 10, 2026

(54) CHIMERIC FILOVIRUS VACCINES

(71) Applicant: KATHOLIEKE UNIVERSITEIT LEUVEN, Leuven (BE)

(72) Inventors: Kai Dallmeier, Kessel-Lo (BE); Lorena Sanchez Felipe, Wijgmaal (BE); Viktor Lemmens, Leuven (BE); Johan Neyts, Kessel-Lo (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 935 days.

(21) Appl. No.: 17/642,791

(22) PCT Filed: Sep. 4, 2020

(86) PCT No.: PCT/EP2020/074701
§ 371 (c)(1),
(2) Date: Mar. 14, 2022

(87) PCT Pub. No.: WO2021/048003
PCT Pub. Date: Mar. 18, 2021

(65) Prior Publication Data

US 2022/0402976 A1 Dec. 22, 2022

(30) Foreign Application Priority Data

Sep. 13, 2019 (EP) .................................... 19197322

(51) Int. Cl.
*C07K 14/005* (2006.01)
*A61K 39/12* (2006.01)
*A61P 31/14* (2006.01)
*A61K 39/00* (2006.01)

(52) U.S. Cl.
CPC ............ *C07K 14/005* (2013.01); *A61K 39/12* (2013.01); *A61P 31/14* (2018.01); *A61K 2039/5254* (2013.01); *C07K 2319/02* (2013.01); *C12N 2770/24122* (2013.01); *C12N 2770/24134* (2013.01); *C12N 2770/24171* (2013.01)

(58) Field of Classification Search
None
See application file for complete search history.

(56) References Cited

FOREIGN PATENT DOCUMENTS

| | | | |
|---|---|---|---|
| WO | 2009114207 | A2 | 9/2009 |
| WO | 2017172622 | A1 | 10/2017 |
| WO | 2018081832 | A1 | 5/2018 |

OTHER PUBLICATIONS

International Search Report mailed Dec. 15, 2020 in reference to co-pending in European Patent Application No. PCT/EP2020/074701 filed Sep. 4, 2020.

Weniger, et al., "Alternative vaccine delivery methods", Section Three, pp. 1200-1231, 2012.

Bredenbeek, et al., "A recombinant Yellow Fever 17D vaccine expressing Lassa virus glycoproteins", Virology, vol. 345, pp. 299-304, 2006.

Cicin-Sain, et al., "Vaccination of Mice with Bacteria Carrying a Cloned Herpesvirus Genome Reconstituted In Vivo", Journal of Virology, vol. 77, No. 15, pp. 8249-8255, Aug. 2003.

Darji, et al., "Oral delivery of DNA vaccines using attenuated *Salmonella typhimurium* as carrier", FEMS Immunology and Medical Microbiology, vol. 27, pp. 341-349, 2000.

Babiuk, et al., "Delivery of DNA Vaccines Using Electroporation", Methods in Molecular Medicine, vol. 127, pp. 73-136, 2004.

Jiang, et al., "Yellow fever 17D-vectored vaccines expressing Lassa virus GP1 and GP2 glycoproteins provide protection against fatal disease in guinea pigs", Vaccine, vol. 29, pp. 1248-1257, 2011.

Lee, et al., "Structure of the Ebola virus glycoprotein bound to an antibody form a human survivor", Nature Articles, vol. 454, pp. 1-7, Jul. 10, 2008.

Martin, et al. "Filovirus proteins for antiviral drug discovery: A structure/function analysis of surface glycoproteins and virus entry", Antiviral Research, vol. 135, pp. 1-14, 2016.

Mcwilliams, et al., "Pseudovirus rVSVΔG-ZEBOV-GP Infects Neurons in Retina and CNS, Causing Apoptosis and Neurodegeneration in Neonatal Mice", Cell Reports, vol. 26, pp. 1718-1726, Feb. 12, 2019.

Muller, et al., "The flavivirus NS1 protein: Molecular and structural biology, immunology, role in pathogenesis and application as a diagnostic biomarker", Antiviral Research, vol. 98, pp. 192-208, 2013.

Nielsen, et al., "Identification of prokaryotic and eukaryotic signal peptides and prediction of their cleavage sites", Short Communication Protein Engineering, vol. 10, No. 01, pp. 1-6, 1997.

Nowak, et al., "Analyses of the Terminal Sequences of West Nile Virus Structural Proteins and of the in Vitro Translation of these Proteins Allow the Proposal of a Complete Scheme of the Proteolytic Cleavages Involved in Their Synthesis", Virology, vol. 169, pp. 365-379, 1989.

*Primary Examiner* — Stacy B Chen
(74) *Attorney, Agent, or Firm* — DINSMORE & SHOHL LLP

(57) ABSTRACT

The present invention relates to polynucleotides comprising a sequence of a live, infectious, attenuated Flavivirus wherein a nucleotide sequence encoding at least a part of a Filovirus glycoprotein is located at the intergenic region between the E and NS1 gene of said Flavivirus, such that a chimeric virus is expressed, characterised in that the encoded sequence C terminally of the E protein of said Flavivirus and N terminally of the signal peptide of the NS1 protein of said Flavivirus comprises in the following order: a further signal peptide of a Flavivirus NS1 protein, a filovirus glycoprotein wherein the N terminal signal peptide is absent, a TM domain of a flaviviral E protein.

20 Claims, 8 Drawing Sheets

Specification includes a Sequence Listing.

2) PLLAV-YFV17D-Ebola-GP-ΔMLD

| | | IIFA-YFV | IIFA-EBO-GP |
|---|---|---|---|
| LAV | SC-YF17D-EBO-GP | + 5/5 | + 5/5 |
| | IP-YF17D-EBO-GP | + 5/5 | + 5/5 |
| PLLAV | SC-YF17D-EBO-GP | - 0/5 | - 0/5 |
| | IP-YF17D-EBO-GP | +3/5 | +3/5 |

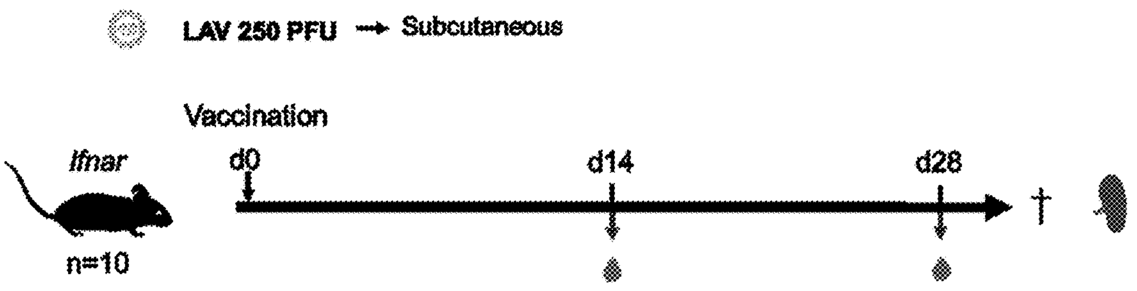
FIG. 5A
| Mouse | IIFA-Ebola-GP titer D28 |
|---|---|
| 646 | 1:1620 |
| 647 | 1:540 |
| 648 | 1:540 |
| 650 | 1:540 |
| 651 | 1:540 |
| 653 | 1:540 |
| 654 | 1:1620 |
| 655 | 1:1620 |
| 656 | 1:1620 |
| 657 | 1:540 |
FIG. 5B
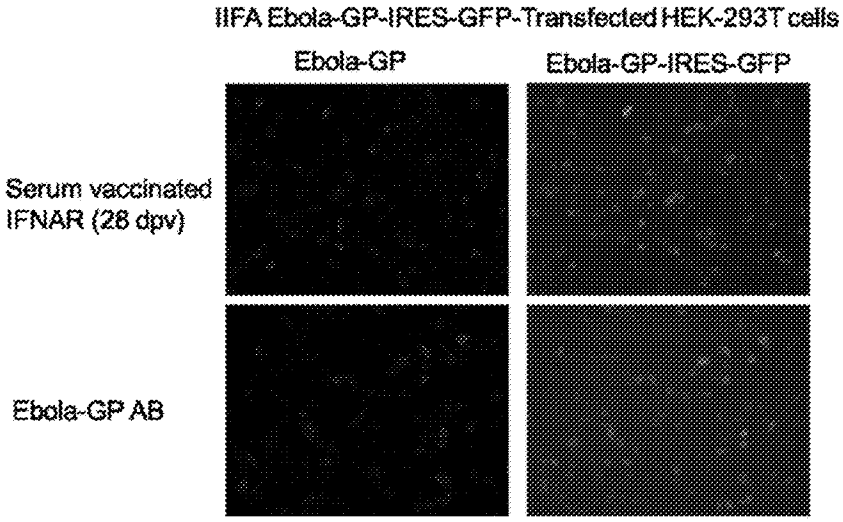
FIG. 5C

SEQUENCE LISTING

```
<160> NUMBER OF SEQ ID NOS: 15

<210> SEQ ID NO 1
<211> LENGTH: 2304
<212> TYPE: DNA
<213> ORGANISM: Artificial Sequence
```

<220> FEATURE:
<223> OTHER INFORMATION: YFV-Ebola chimer
<220> FEATURE:
<221> NAME/KEY: CDS
<222> LOCATION: (1)..(2304)

<400> SEQUENCE: 1 aag gtc atc atg ggg gcg gta ctt ata tgg gtt ggc atc aac aca aga 48
Lys Val Ile Met Gly Ala Val Leu Ile Trp Val Gly Ile Asn Thr Arg
1 5 10 15 aac atg aca atg tcc atg agc atg atc ttg gta gga gtg atc atg atg 96
Asn Met Thr Met Ser Met Ser Met Ile Leu Val Gly Val Ile Met Met
20 25 30 ttt ttg tct cta gga gtt ggc gcc gac cag ggc tgc gcg ata aat ttc 144
Phe Leu Ser Leu Gly Val Gly Ala Asp Gln Gly Cys Ala Ile Asn Phe
35 40 45 ggt atc ccg ctt gga gtt atc cac aat agt aca tta cag gtt agt gat 192
Gly Ile Pro Leu Gly Val Ile His Asn Ser Thr Leu Gln Val Ser Asp
50 55 60 gtc gac aaa cta gtt tgt cgt gac aaa ctg tca tcc aca aat caa ttg 240
Val Asp Lys Leu Val Cys Arg Asp Lys Leu Ser Ser Thr Asn Gln Leu
65 70 75 80 aga tca gtt gga ctg aat ctc gag ggg aat gga gtg gca act gac gtg 288
Arg Ser Val Gly Leu Asn Leu Glu Gly Asn Gly Val Ala Thr Asp Val
85 90 95 cca tct gtg act aaa aga tgg ggc ttc agg tcc ggt gtc cca cca aag 336
Pro Ser Val Thr Lys Arg Trp Gly Phe Arg Ser Gly Val Pro Pro Lys
100 105 110 gtg gtc aat tat gaa gct ggt gaa tgg gct gaa aac tgc tac aat ctt 384
Val Val Asn Tyr Glu Ala Gly Glu Trp Ala Glu Asn Cys Tyr Asn Leu
115 120 125 gaa atc aaa aaa cct gac ggg agt gag tgt cta cca gca gcg cca gac 432
Glu Ile Lys Lys Pro Asp Gly Ser Glu Cys Leu Pro Ala Ala Pro Asp
130 135 140 ggg att cgg ggc ttc ccc cgg tgc cgg tat gtg cac aaa gta tca gga 480
Gly Ile Arg Gly Phe Pro Arg Cys Arg Tyr Val His Lys Val Ser Gly
145 150 155 160 acg gga cca tgt gcc gga gac ttt gcc ttc cac aaa gag ggt gct ttc 528
Thr Gly Pro Cys Ala Gly Asp Phe Ala Phe His Lys Glu Gly Ala Phe
165 170 175 ttc ctg tat gat cga ctt gct tcc aca gtt atc tac cga gga acg act 576
Phe Leu Tyr Asp Arg Leu Ala Ser Thr Val Ile Tyr Arg Gly Thr Thr
180 185 190 ttc gct gaa ggt gtc gtt gca ttt ctg ata ctg ccc caa gct aag aag 624
Phe Ala Glu Gly Val Val Ala Phe Leu Ile Leu Pro Gln Ala Lys Lys
195 200 205 gac ttc ttc agc tca cac ccc ttg aga gag ccg gtc aat gca acg gag 672
Asp Phe Phe Ser Ser His Pro Leu Arg Glu Pro Val Asn Ala Thr Glu
210 215 220 gac ccg tcg agt ggc tat tat tct acc aca att aga tat cag gct acc 720
Asp Pro Ser Ser Gly Tyr Tyr Ser Thr Thr Ile Arg Tyr Gln Ala Thr
225 230 235 240 ggt ttt gga act aat gag aca gag tac ttg ttc gag gtt gac aat ttg 768
Gly Phe Gly Thr Asn Glu Thr Glu Tyr Leu Phe Glu Val Asp Asn Leu
245 250 255 acc tac gtc caa ctt gaa tca aga ttc aca cca cag ttt ctg ctc cag 816
Thr Tyr Val Gln Leu Glu Ser Arg Phe Thr Pro Gln Phe Leu Leu Gln
260 265 270 ctg aat gag aca ata tat gca agt ggg aag agg agc aac acc acg gga 864
Leu Asn Glu Thr Ile Tyr Ala Ser Gly Lys Arg Ser Asn Thr Thr Gly
275 280 285

```
aaa cta att tgg aag gtc aac ccc gaa att gat aca aca atc ggg gag      912
Lys Leu Ile Trp Lys Val Asn Pro Glu Ile Asp Thr Thr Ile Gly Glu
    290                 295                 300

tgg gcc ttc tgg gaa act aag aag aac ctc act aga aaa att cgc agt      960
Trp Ala Phe Trp Glu Thr Lys Lys Asn Leu Thr Arg Lys Ile Arg Ser
305                 310                 315                 320

gaa gag ttg tct ttc aca gct gta tca aac gga ccc aaa aac atc agt     1008
Glu Glu Leu Ser Phe Thr Ala Val Ser Asn Gly Pro Lys Asn Ile Ser
                325                 330                 335

ggt cag agt ccg gcg cga act tct tcc gac cca gag acc aac aca aca     1056
Gly Gln Ser Pro Ala Arg Thr Ser Ser Asp Pro Glu Thr Asn Thr Thr
            340                 345                 350

aat gaa gac cac aaa atc atg gct tca gaa aat tcc tct gca atg gtt     1104
Asn Glu Asp His Lys Ile Met Ala Ser Glu Asn Ser Ser Ala Met Val
        355                 360                 365

caa gtg cac agt caa gga agg aaa gct gca gtg tcg cat ctg aca acc     1152
Gln Val His Ser Gln Gly Arg Lys Ala Ala Val Ser His Leu Thr Thr
    370                 375                 380

ctt gcc aca atc tcc acg agt cct caa cct ccc aca acc aaa aca ggt     1200
Leu Ala Thr Ile Ser Thr Ser Pro Gln Pro Pro Thr Thr Lys Thr Gly
385                 390                 395                 400

ccg gac aac agc acc cat aat aca ccc gtg tat aaa ctt gac atc tct     1248
Pro Asp Asn Ser Thr His Asn Thr Pro Val Tyr Lys Leu Asp Ile Ser
                405                 410                 415

gag gca act caa gtt gga caa cat cac cgt aga gca gac aac gac agc     1296
Glu Ala Thr Gln Val Gly Gln His His Arg Arg Ala Asp Asn Asp Ser
            420                 425                 430

aca gcc tcc gac act ccc ccc gcc acg acc gca gcc gga ccc tta aaa     1344
Thr Ala Ser Asp Thr Pro Pro Ala Thr Thr Ala Ala Gly Pro Leu Lys
        435                 440                 445

gca gag aac acc aac acg agt aag agc gct gac tcc ctg gac ctc gcc     1392
Ala Glu Asn Thr Asn Thr Ser Lys Ser Ala Asp Ser Leu Asp Leu Ala
    450                 455                 460

acc acg aca agc ccc caa aac tac agc gag act gct ggc aac aac aac     1440
Thr Thr Thr Ser Pro Gln Asn Tyr Ser Glu Thr Ala Gly Asn Asn Asn
465                 470                 475                 480

act cat cac caa gat acc gga gaa gag agt gcc agc agc ggg aag cta     1488
Thr His His Gln Asp Thr Gly Glu Glu Ser Ala Ser Ser Gly Lys Leu
                485                 490                 495

ggc tta att acc aat act att gct gga gta gca gga ctg atc aca ggc     1536
Gly Leu Ile Thr Asn Thr Ile Ala Gly Val Ala Gly Leu Ile Thr Gly
            500                 505                 510

ggg aga agg act cga aga gaa gta att gtc aat gct caa ccc aaa tgc     1584
Gly Arg Arg Thr Arg Arg Glu Val Ile Val Asn Ala Gln Pro Lys Cys
        515                 520                 525

aac ccc aat tta cat tac tgg act act cag gat gaa ggt gct gca atc     1632
Asn Pro Asn Leu His Tyr Trp Thr Thr Gln Asp Glu Gly Ala Ala Ile
    530                 535                 540

gga ttg gcc tgg ata cca tat ttc ggg cca gca gcc gaa gga att tac     1680
Gly Leu Ala Trp Ile Pro Tyr Phe Gly Pro Ala Ala Glu Gly Ile Tyr
545                 550                 555                 560

aca gag ggg cta atg cac aac caa gat ggt tta atc tgt ggg ttg agg     1728
Thr Glu Gly Leu Met His Asn Gln Asp Gly Leu Ile Cys Gly Leu Arg
                565                 570                 575

cag ctg gcc aac gaa acg act caa gct ctc caa ctg ttc ctg aga gcc     1776
Gln Leu Ala Asn Glu Thr Thr Gln Ala Leu Gln Leu Phe Leu Arg Ala
            580                 585                 590
```

```
aca act gag ctg cga acc ttt tca atc ctc aac cgt aag gca att gac     1824
Thr Thr Glu Leu Arg Thr Phe Ser Ile Leu Asn Arg Lys Ala Ile Asp
        595                 600                 605

ttc ctg ctg cag cga tgg ggt ggc aca tgc cac att ttg gga ccg gac     1872
Phe Leu Leu Gln Arg Trp Gly Gly Thr Cys His Ile Leu Gly Pro Asp
    610                 615                 620

tgc tgt atc gaa cca cat gat tgg acc aag aac ata aca gac aaa att     1920
Cys Cys Ile Glu Pro His Asp Trp Thr Lys Asn Ile Thr Asp Lys Ile
625                 630                 635                 640

gat cag att att cat gat ttt gtt gat aaa acc ctt ccg gac cag ggg     1968
Asp Gln Ile Ile His Asp Phe Val Asp Lys Thr Leu Pro Asp Gln Gly
                645                 650                 655

gac aat gac aat tgg tgg aca gga tgg aga caa tgg ata ccg gca ggt     2016
Asp Asn Asp Asn Trp Trp Thr Gly Trp Arg Gln Trp Ile Pro Ala Gly
            660                 665                 670

att gga gtt aca ggt gtt ata att gca gtt atc gct tta ttc tgt ata     2064
Ile Gly Val Thr Gly Val Ile Ile Ala Val Ile Ala Leu Phe Cys Ile
        675                 680                 685

tgc aaa ttt gtc ttt agg tca att gct atg acg ttt ctt gcg gtt gga     2112
Cys Lys Phe Val Phe Arg Ser Ile Ala Met Thr Phe Leu Ala Val Gly
    690                 695                 700

gga gtt ttg ctc ttc ctt tcg gtc aac gtc cat gct gat caa gga tgc     2160
Gly Val Leu Leu Phe Leu Ser Val Asn Val His Ala Asp Gln Gly Cys
705                 710                 715                 720

gcc atc aac ttt ggc aag aga gag ctc aag tgc gga gat ggt atc ttc     2208
Ala Ile Asn Phe Gly Lys Arg Glu Leu Lys Cys Gly Asp Gly Ile Phe
                725                 730                 735

ata ttt aga gac tct gat gac tgg ctg aac aag tac tca tac tat cca     2256
Ile Phe Arg Asp Ser Asp Asp Trp Leu Asn Lys Tyr Ser Tyr Tyr Pro
            740                 745                 750

gaa gat cct gtg aag ctt gca tca ata gtg aaa gcc tct ttt gaa gaa     2304
Glu Asp Pro Val Lys Leu Ala Ser Ile Val Lys Ala Ser Phe Glu Glu
        755                 760                 765
```

<210> SEQ ID NO 2
<211> LENGTH: 768
<212> TYPE: PRT
<213> ORGANISM: Artificial Sequence
<220> FEATURE:
<223> OTHER INFORMATION: Synthetic Construct

<400> SEQUENCE: 2

```
Lys Val Ile Met Gly Ala Val Leu Ile Trp Val Gly Ile Asn Thr Arg
1               5                   10                  15

Asn Met Thr Met Ser Met Ser Met Ile Leu Val Gly Val Ile Met Met
            20                  25                  30

Phe Leu Ser Leu Gly Val Gly Ala Asp Gln Gly Cys Ala Ile Asn Phe
        35                  40                  45

Gly Ile Pro Leu Gly Val Ile His Asn Ser Thr Leu Gln Val Ser Asp
    50                  55                  60

Val Asp Lys Leu Val Cys Arg Asp Lys Leu Ser Ser Thr Asn Gln Leu
65                  70                  75                  80

Arg Ser Val Gly Leu Asn Leu Glu Gly Asn Gly Val Ala Thr Asp Val
                85                  90                  95

Pro Ser Val Thr Lys Arg Trp Gly Phe Arg Ser Gly Val Pro Pro Lys
            100                 105                 110

Val Val Asn Tyr Glu Ala Gly Glu Trp Ala Glu Asn Cys Tyr Asn Leu
        115                 120                 125
```

-continued

```
Glu Ile Lys Lys Pro Asp Gly Ser Glu Cys Leu Pro Ala Ala Pro Asp
    130                 135                 140

Gly Ile Arg Gly Phe Pro Arg Cys Arg Tyr Val His Lys Val Ser Gly
145                 150                 155                 160

Thr Gly Pro Cys Ala Gly Asp Phe Ala Phe His Lys Glu Gly Ala Phe
                165                 170                 175

Phe Leu Tyr Asp Arg Leu Ala Ser Thr Val Ile Tyr Arg Gly Thr Thr
            180                 185                 190

Phe Ala Glu Gly Val Val Ala Phe Leu Ile Leu Pro Gln Ala Lys Lys
        195                 200                 205

Asp Phe Phe Ser Ser His Pro Leu Arg Glu Pro Val Asn Ala Thr Glu
    210                 215                 220

Asp Pro Ser Ser Gly Tyr Tyr Ser Thr Thr Ile Arg Tyr Gln Ala Thr
225                 230                 235                 240

Gly Phe Gly Thr Asn Glu Thr Glu Tyr Leu Phe Glu Val Asp Asn Leu
                245                 250                 255

Thr Tyr Val Gln Leu Glu Ser Arg Phe Thr Pro Gln Phe Leu Leu Gln
            260                 265                 270

Leu Asn Glu Thr Ile Tyr Ala Ser Gly Lys Arg Ser Asn Thr Thr Gly
        275                 280                 285

Lys Leu Ile Trp Lys Val Asn Pro Glu Ile Asp Thr Thr Ile Gly Glu
    290                 295                 300

Trp Ala Phe Trp Glu Thr Lys Lys Asn Leu Thr Arg Lys Ile Arg Ser
305                 310                 315                 320

Glu Glu Leu Ser Phe Thr Ala Val Ser Asn Gly Pro Lys Asn Ile Ser
                325                 330                 335

Gly Gln Ser Pro Ala Arg Thr Ser Ser Asp Pro Glu Thr Asn Thr Thr
            340                 345                 350

Asn Glu Asp His Lys Ile Met Ala Ser Glu Asn Ser Ser Ala Met Val
        355                 360                 365

Gln Val His Ser Gln Gly Arg Lys Ala Ala Val Ser His Leu Thr Thr
    370                 375                 380

Leu Ala Thr Ile Ser Thr Ser Pro Gln Pro Pro Thr Thr Lys Thr Gly
385                 390                 395                 400

Pro Asp Asn Ser Thr His Asn Thr Pro Val Tyr Lys Leu Asp Ile Ser
                405                 410                 415

Glu Ala Thr Gln Val Gly Gln His His Arg Arg Ala Asp Asn Asp Ser
            420                 425                 430

Thr Ala Ser Asp Thr Pro Pro Ala Thr Thr Ala Ala Gly Pro Leu Lys
        435                 440                 445

Ala Glu Asn Thr Asn Thr Ser Lys Ser Ala Asp Ser Leu Asp Leu Ala
    450                 455                 460

Thr Thr Thr Ser Pro Gln Asn Tyr Ser Glu Thr Ala Gly Asn Asn Asn
465                 470                 475                 480

Thr His His Gln Asp Thr Gly Glu Glu Ser Ala Ser Ser Gly Lys Leu
                485                 490                 495

Gly Leu Ile Thr Asn Thr Ile Ala Gly Val Ala Gly Leu Ile Thr Gly
            500                 505                 510

Gly Arg Arg Thr Arg Arg Glu Val Ile Val Asn Ala Gln Pro Lys Cys
        515                 520                 525

Asn Pro Asn Leu His Tyr Trp Thr Thr Gln Asp Glu Gly Ala Ala Ile
    530                 535                 540

Gly Leu Ala Trp Ile Pro Tyr Phe Gly Pro Ala Ala Glu Gly Ile Tyr
```

```
545                 550                 555                 560

Thr Glu Gly Leu Met His Asn Gln Asp Gly Leu Ile Cys Gly Leu Arg
                565                 570                 575

Gln Leu Ala Asn Glu Thr Thr Gln Ala Leu Gln Leu Phe Leu Arg Ala
            580                 585                 590

Thr Thr Glu Leu Arg Thr Phe Ser Ile Leu Asn Arg Lys Ala Ile Asp
        595                 600                 605

Phe Leu Leu Gln Arg Trp Gly Gly Thr Cys His Ile Leu Gly Pro Asp
    610                 615                 620

Cys Cys Ile Glu Pro His Asp Trp Thr Lys Asn Ile Thr Asp Lys Ile
625                 630                 635                 640

Asp Gln Ile Ile His Asp Phe Val Asp Lys Thr Leu Pro Asp Gln Gly
                645                 650                 655

Asp Asn Asp Asn Trp Trp Thr Gly Trp Arg Gln Trp Ile Pro Ala Gly
            660                 665                 670

Ile Gly Val Thr Gly Val Ile Ile Ala Val Ile Ala Leu Phe Cys Ile
        675                 680                 685

Cys Lys Phe Val Phe Arg Ser Ile Ala Met Thr Phe Leu Ala Val Gly
    690                 695                 700

Gly Val Leu Leu Phe Leu Ser Val Asn Val His Ala Asp Gln Gly Cys
705                 710                 715                 720

Ala Ile Asn Phe Gly Lys Arg Glu Leu Lys Cys Gly Asp Gly Ile Phe
                725                 730                 735

Ile Phe Arg Asp Ser Asp Asp Trp Leu Asn Lys Tyr Ser Tyr Tyr Pro
            740                 745                 750

Glu Asp Pro Val Lys Leu Ala Ser Ile Val Lys Ala Ser Phe Glu Glu
        755                 760                 765


<210> SEQ ID NO 3
<211> LENGTH: 1854
<212> TYPE: DNA
<213> ORGANISM: Artificial Sequence
<220> FEATURE:
<223> OTHER INFORMATION: YFV -Ebola chimer
<220> FEATURE:
<221> NAME/KEY: CDS
<222> LOCATION: (1)..(1854)

<400> SEQUENCE: 3

aag gtc atc atg ggg gcg gta ctt ata tgg gtt ggc atc aac aca aga       48
Lys Val Ile Met Gly Ala Val Leu Ile Trp Val Gly Ile Asn Thr Arg
1               5                   10                  15

aac atg aca atg tcc atg agc atg atc ttg gta gga gtg atc atg atg       96
Asn Met Thr Met Ser Met Ser Met Ile Leu Val Gly Val Ile Met Met
            20                  25                  30

ttt ttg tct cta gga gtt ggc gcc gac cag ggc tgc gcg ata aat ttc      144
Phe Leu Ser Leu Gly Val Gly Ala Asp Gln Gly Cys Ala Ile Asn Phe
        35                  40                  45

ggt atc ccg ctt gga gtt atc cac aat agt aca tta cag gtt agt gat      192
Gly Ile Pro Leu Gly Val Ile His Asn Ser Thr Leu Gln Val Ser Asp
    50                  55                  60

gtc gac aaa cta gtt tgt cgt gac aaa ctg tca tcc aca aat caa ttg      240
Val Asp Lys Leu Val Cys Arg Asp Lys Leu Ser Ser Thr Asn Gln Leu
65                  70                  75                  80

aga tca gtt gga ctg aat ctc gag ggg aat gga gtg gca act gac gtg      288
Arg Ser Val Gly Leu Asn Leu Glu Gly Asn Gly Val Ala Thr Asp Val
                85                  90                  95

cca tct gtg act aaa aga tgg ggc ttc agg tcc ggt gtc cca cca aag      336
```

-continued

```
Pro Ser Val Thr Lys Arg Trp Gly Phe Arg Ser Gly Val Pro Pro Lys
            100                 105                 110

gtg gtc aat tat gaa gct ggt gaa tgg gct gaa aac tgc tac aat ctt      384
Val Val Asn Tyr Glu Ala Gly Glu Trp Ala Glu Asn Cys Tyr Asn Leu
        115                 120                 125

gaa atc aaa aaa cct gac ggg agt gag tgt cta cca gca gcg cca gac      432
Glu Ile Lys Lys Pro Asp Gly Ser Glu Cys Leu Pro Ala Ala Pro Asp
    130                 135                 140

ggg att cgg ggc ttc ccc cgg tgc cgg tat gtg cac aaa gta tca gga      480
Gly Ile Arg Gly Phe Pro Arg Cys Arg Tyr Val His Lys Val Ser Gly
145                 150                 155                 160

acg gga cca tgt gcc gga gac ttt gcc ttc cac aaa gag ggt gct ttc      528
Thr Gly Pro Cys Ala Gly Asp Phe Ala Phe His Lys Glu Gly Ala Phe
                165                 170                 175

ttc ctg tat gat cga ctt gct tcc aca gtt atc tac cga gga acg act      576
Phe Leu Tyr Asp Arg Leu Ala Ser Thr Val Ile Tyr Arg Gly Thr Thr
            180                 185                 190

ttc gct gaa ggt gtc gtt gca ttt ctg ata ctg ccc caa gct aag aag      624
Phe Ala Glu Gly Val Val Ala Phe Leu Ile Leu Pro Gln Ala Lys Lys
        195                 200                 205

gac ttc ttc agc tca cac ccc ttg aga gag ccg gtc aat gca acg gag      672
Asp Phe Phe Ser Ser His Pro Leu Arg Glu Pro Val Asn Ala Thr Glu
    210                 215                 220

gac ccg tcg agt ggc tat tat tct acc aca att aga tat cag gct acc      720
Asp Pro Ser Ser Gly Tyr Tyr Ser Thr Thr Ile Arg Tyr Gln Ala Thr
225                 230                 235                 240

ggt ttt gga act aat gag aca gag tac ttg ttc gag gtt gac aat ttg      768
Gly Phe Gly Thr Asn Glu Thr Glu Tyr Leu Phe Glu Val Asp Asn Leu
                245                 250                 255

acc tac gtc caa ctt gaa tca aga ttc aca cca cag ttt ctg ctc cag      816
Thr Tyr Val Gln Leu Glu Ser Arg Phe Thr Pro Gln Phe Leu Leu Gln
            260                 265                 270

ctg aat gag aca ata tat gca agt ggg aag agg agc aac acc acg gga      864
Leu Asn Glu Thr Ile Tyr Ala Ser Gly Lys Arg Ser Asn Thr Thr Gly
        275                 280                 285

aaa cta att tgg aag gtc aac ccc gaa att gat aca aca atc ggg gag      912
Lys Leu Ile Trp Lys Val Asn Pro Glu Ile Asp Thr Thr Ile Gly Glu
    290                 295                 300

tgg gcc ttc tgg gaa act aag aag aac ctc act aga aaa att cgc agt      960
Trp Ala Phe Trp Glu Thr Lys Lys Asn Leu Thr Arg Lys Ile Arg Ser
305                 310                 315                 320

gaa gag ttg tct ttc aca gct gta tca aac act cat cac caa gat acc     1008
Glu Glu Leu Ser Phe Thr Ala Val Ser Asn Thr His His Gln Asp Thr
                325                 330                 335

gga gaa gag agt gcc agc agc ggg aag cta ggc tta att acc aat act     1056
Gly Glu Glu Ser Ala Ser Ser Gly Lys Leu Gly Leu Ile Thr Asn Thr
            340                 345                 350

att gct gga gta gca gga ctg atc aca ggc ggg aga agg act cga aga     1104
Ile Ala Gly Val Ala Gly Leu Ile Thr Gly Gly Arg Arg Thr Arg Arg
        355                 360                 365

gaa gta att gtc aat gct caa ccc aaa tgc aac ccc aat tta cat tac     1152
Glu Val Ile Val Asn Ala Gln Pro Lys Cys Asn Pro Asn Leu His Tyr
    370                 375                 380

tgg act act cag gat gaa ggt gct gca atc gga ttg gcc tgg ata cca     1200
Trp Thr Thr Gln Asp Glu Gly Ala Ala Ile Gly Leu Ala Trp Ile Pro
385                 390                 395                 400

tat ttc ggg cca gca gcc gaa gga att tac aca gag ggg cta atg cac     1248
Tyr Phe Gly Pro Ala Ala Glu Gly Ile Tyr Thr Glu Gly Leu Met His
                405                 410                 415
```

```
aac caa gat ggt tta atc tgt ggg ttg agg cag ctg gcc aac gaa acg      1296
Asn Gln Asp Gly Leu Ile Cys Gly Leu Arg Gln Leu Ala Asn Glu Thr
            420                 425                 430

act caa gct ctc caa ctg ttc ctg aga gcc aca act gag ctg cga acc      1344
Thr Gln Ala Leu Gln Leu Phe Leu Arg Ala Thr Thr Glu Leu Arg Thr
        435                 440                 445

ttt tca atc ctc aac cgt aag gca att gac ttc ctg ctg cag cga tgg      1392
Phe Ser Ile Leu Asn Arg Lys Ala Ile Asp Phe Leu Leu Gln Arg Trp
    450                 455                 460

ggt ggc aca tgc cac att ttg gga ccg gac tgc tgt atc gaa cca cat      1440
Gly Gly Thr Cys His Ile Leu Gly Pro Asp Cys Cys Ile Glu Pro His
465                 470                 475                 480

gat tgg acc aag aac ata aca gac aaa att gat cag att att cat gat      1488
Asp Trp Thr Lys Asn Ile Thr Asp Lys Ile Asp Gln Ile Ile His Asp
                485                 490                 495

ttt gtt gat aaa acc ctt ccg gac cag ggg gac aat gac aat tgg tgg      1536
Phe Val Asp Lys Thr Leu Pro Asp Gln Gly Asp Asn Asp Asn Trp Trp
            500                 505                 510

aca gga tgg aga caa tgg ata ccg gca ggt att gga gtt aca ggt gtt      1584
Thr Gly Trp Arg Gln Trp Ile Pro Ala Gly Ile Gly Val Thr Gly Val
        515                 520                 525

ata att gca gtt atc gct tta ttc tgt ata tgc aaa ttt gtc ttt agg      1632
Ile Ile Ala Val Ile Ala Leu Phe Cys Ile Cys Lys Phe Val Phe Arg
    530                 535                 540

tca att gct atg acg ttt ctt gcg gtt gga gga gtt ttg ctc ttc ctt      1680
Ser Ile Ala Met Thr Phe Leu Ala Val Gly Gly Val Leu Leu Phe Leu
545                 550                 555                 560

tcg gtc aac gtc cat gct gat caa gga tgc gcc atc aac ttt ggc aag      1728
Ser Val Asn Val His Ala Asp Gln Gly Cys Ala Ile Asn Phe Gly Lys
                565                 570                 575

aga gag ctc aag tgc gga gat ggt atc ttc ata ttt aga gac tct gat      1776
Arg Glu Leu Lys Cys Gly Asp Gly Ile Phe Ile Phe Arg Asp Ser Asp
            580                 585                 590

gac tgg ctg aac aag tac tca tac tat cca gaa gat cct gtg aag ctt      1824
Asp Trp Leu Asn Lys Tyr Ser Tyr Tyr Pro Glu Asp Pro Val Lys Leu
        595                 600                 605

gca tca ata gtg aaa gcc tct ttt gaa gaa                              1854
Ala Ser Ile Val Lys Ala Ser Phe Glu Glu
    610                 615


<210> SEQ ID NO 4
<211> LENGTH: 618
<212> TYPE: PRT
<213> ORGANISM: Artificial Sequence
<220> FEATURE:
<223> OTHER INFORMATION: Synthetic Construct

<400> SEQUENCE: 4

Lys Val Ile Met Gly Ala Val Leu Ile Trp Val Gly Ile Asn Thr Arg
1               5                   10                  15

Asn Met Thr Met Ser Met Ser Met Ile Leu Val Gly Val Ile Met Met
            20                  25                  30

Phe Leu Ser Leu Gly Val Gly Ala Asp Gln Gly Cys Ala Ile Asn Phe
        35                  40                  45

Gly Ile Pro Leu Gly Val Ile His Asn Ser Thr Leu Gln Val Ser Asp
    50                  55                  60

Val Asp Lys Leu Val Cys Arg Asp Lys Leu Ser Ser Thr Asn Gln Leu
65                  70                  75                  80

Arg Ser Val Gly Leu Asn Leu Glu Gly Asn Gly Val Ala Thr Asp Val
                85                  90                  95
```

```
Pro Ser Val Thr Lys Arg Trp Gly Phe Arg Ser Gly Val Pro Pro Lys
            100                 105                 110

Val Val Asn Tyr Glu Ala Gly Glu Trp Ala Glu Asn Cys Tyr Asn Leu
        115                 120                 125

Glu Ile Lys Lys Pro Asp Gly Ser Glu Cys Leu Pro Ala Ala Pro Asp
    130                 135                 140

Gly Ile Arg Gly Phe Pro Arg Cys Arg Tyr Val His Lys Val Ser Gly
145                 150                 155                 160

Thr Gly Pro Cys Ala Gly Asp Phe Ala Phe His Lys Glu Gly Ala Phe
                165                 170                 175

Phe Leu Tyr Asp Arg Leu Ala Ser Thr Val Ile Tyr Arg Gly Thr Thr
            180                 185                 190

Phe Ala Glu Gly Val Val Ala Phe Leu Ile Leu Pro Gln Ala Lys Lys
        195                 200                 205

Asp Phe Phe Ser Ser His Pro Leu Arg Glu Pro Val Asn Ala Thr Glu
    210                 215                 220

Asp Pro Ser Ser Gly Tyr Tyr Ser Thr Thr Ile Arg Tyr Gln Ala Thr
225                 230                 235                 240

Gly Phe Gly Thr Asn Glu Thr Glu Tyr Leu Phe Glu Val Asp Asn Leu
                245                 250                 255

Thr Tyr Val Gln Leu Glu Ser Arg Phe Thr Pro Gln Phe Leu Leu Gln
            260                 265                 270

Leu Asn Glu Thr Ile Tyr Ala Ser Gly Lys Arg Ser Asn Thr Thr Gly
        275                 280                 285

Lys Leu Ile Trp Lys Val Asn Pro Glu Ile Asp Thr Thr Ile Gly Glu
    290                 295                 300

Trp Ala Phe Trp Glu Thr Lys Lys Asn Leu Thr Arg Lys Ile Arg Ser
305                 310                 315                 320

Glu Glu Leu Ser Phe Thr Ala Val Ser Asn Thr His His Gln Asp Thr
                325                 330                 335

Gly Glu Glu Ser Ala Ser Ser Gly Lys Leu Gly Leu Ile Thr Asn Thr
            340                 345                 350

Ile Ala Gly Val Ala Gly Leu Ile Thr Gly Gly Arg Arg Thr Arg Arg
        355                 360                 365

Glu Val Ile Val Asn Ala Gln Pro Lys Cys Asn Pro Asn Leu His Tyr
    370                 375                 380

Trp Thr Thr Gln Asp Glu Gly Ala Ala Ile Gly Leu Ala Trp Ile Pro
385                 390                 395                 400

Tyr Phe Gly Pro Ala Ala Glu Gly Ile Tyr Thr Glu Gly Leu Met His
                405                 410                 415

Asn Gln Asp Gly Leu Ile Cys Gly Leu Arg Gln Leu Ala Asn Glu Thr
            420                 425                 430

Thr Gln Ala Leu Gln Leu Phe Leu Arg Ala Thr Thr Glu Leu Arg Thr
        435                 440                 445

Phe Ser Ile Leu Asn Arg Lys Ala Ile Asp Phe Leu Leu Gln Arg Trp
    450                 455                 460

Gly Gly Thr Cys His Ile Leu Gly Pro Asp Cys Cys Ile Glu Pro His
465                 470                 475                 480

Asp Trp Thr Lys Asn Ile Thr Asp Lys Ile Asp Gln Ile Ile His Asp
                485                 490                 495

Phe Val Asp Lys Thr Leu Pro Asp Gln Gly Asp Asn Asp Asn Trp Trp
            500                 505                 510
```

```
Thr Gly Trp Arg Gln Trp Ile Pro Ala Gly Ile Gly Val Thr Gly Val
        515                 520                 525

Ile Ile Ala Val Ile Ala Leu Phe Cys Ile Cys Lys Phe Val Phe Arg
    530                 535                 540

Ser Ile Ala Met Thr Phe Leu Ala Val Gly Gly Val Leu Leu Phe Leu
545                 550                 555                 560

Ser Val Asn Val His Ala Asp Gln Gly Cys Ala Ile Asn Phe Gly Lys
                565                 570                 575

Arg Glu Leu Lys Cys Gly Asp Gly Ile Phe Ile Phe Arg Asp Ser Asp
            580                 585                 590

Asp Trp Leu Asn Lys Tyr Ser Tyr Tyr Pro Glu Asp Pro Val Lys Leu
        595                 600                 605

Ala Ser Ile Val Lys Ala Ser Phe Glu Glu
    610                 615


<210> SEQ ID NO 5
<211> LENGTH: 96
<212> TYPE: DNA
<213> ORGANISM: Ebola virus
<220> FEATURE:
<221> NAME/KEY: CDS
<222> LOCATION: (1)..(96)

<400> SEQUENCE: 5

atg ggt gtt aca gga ata ttg cag tta cct cgt gat cga ttc aag agg       48
Met Gly Val Thr Gly Ile Leu Gln Leu Pro Arg Asp Arg Phe Lys Arg
1               5                   10                  15

aca tca ttc ttt ctt tgg gta att atc ctt ttc caa aga aca ttt tcc       96
Thr Ser Phe Phe Leu Trp Val Ile Ile Leu Phe Gln Arg Thr Phe Ser
            20                  25                  30


<210> SEQ ID NO 6
<211> LENGTH: 32
<212> TYPE: PRT
<213> ORGANISM: Ebola virus

<400> SEQUENCE: 6

Met Gly Val Thr Gly Ile Leu Gln Leu Pro Arg Asp Arg Phe Lys Arg
1               5                   10                  15

Thr Ser Phe Phe Leu Trp Val Ile Ile Leu Phe Gln Arg Thr Phe Ser
            20                  25                  30


<210> SEQ ID NO 7
<211> LENGTH: 150
<212> TYPE: PRT
<213> ORGANISM: Ebola virus

<400> SEQUENCE: 7

Asn Gly Pro Lys Asn Ile Ser Gly Gln Ser Pro Ala Arg Thr Ser Ser
1               5                   10                  15

Asp Pro Glu Thr Asn Thr Thr Asn Glu Asp His Lys Ile Met Ala Ser
            20                  25                  30

Glu Asn Ser Ser Ala Met Val Gln Val His Ser Gln Gly Arg Lys Ala
        35                  40                  45

Ala Val Ser His Leu Thr Thr Leu Ala Thr Ile Ser Thr Ser Pro Gln
    50                  55                  60

Pro Pro Thr Thr Lys Thr Gly Pro Asp Asn Ser Thr His Asn Thr Pro
65                  70                  75                  80

Val Tyr Lys Leu Asp Ile Ser Glu Ala Thr Gln Val Gly Gln His His
                85                  90                  95
```

```
Arg Arg Ala Asp Asn Asp Ser Thr Ala Ser Asp Thr Pro Pro Ala Thr
            100                 105                 110

Thr Ala Ala Gly Pro Leu Lys Ala Glu Asn Thr Asn Thr Ser Lys Ser
        115                 120                 125

Ala Asp Ser Leu Asp Leu Ala Thr Thr Thr Ser Pro Gln Asn Tyr Ser
    130                 135                 140

Glu Thr Ala Gly Asn Asn
145                 150


<210> SEQ ID NO 8
<211> LENGTH: 676
<212> TYPE: PRT
<213> ORGANISM: Ebola virus

<400> SEQUENCE: 8

Met Gly Val Thr Gly Ile Leu Gln Leu Pro Arg Asp Arg Phe Lys Arg
1               5                   10                  15

Thr Ser Phe Phe Leu Trp Val Ile Ile Leu Phe Gln Arg Thr Phe Ser
            20                  25                  30

Ile Pro Leu Gly Val Ile His Asn Ser Thr Leu Gln Val Ser Asp Val
        35                  40                  45

Asp Lys Leu Val Cys Arg Asp Lys Leu Ser Ser Thr Asn Gln Leu Arg
    50                  55                  60

Ser Val Gly Leu Asn Leu Glu Gly Asn Gly Val Ala Thr Asp Val Pro
65                  70                  75                  80

Ser Val Thr Lys Arg Trp Gly Phe Arg Ser Gly Val Pro Pro Lys Val
                85                  90                  95

Val Asn Tyr Glu Ala Gly Glu Trp Ala Glu Asn Cys Tyr Asn Leu Glu
            100                 105                 110

Ile Lys Lys Pro Asp Gly Ser Glu Cys Leu Pro Ala Ala Pro Asp Gly
        115                 120                 125

Ile Arg Gly Phe Pro Arg Cys Arg Tyr Val His Lys Val Ser Gly Thr
    130                 135                 140

Gly Pro Cys Ala Gly Asp Phe Ala Phe His Lys Glu Gly Ala Phe Phe
145                 150                 155                 160

Leu Tyr Asp Arg Leu Ala Ser Thr Val Ile Tyr Arg Gly Thr Thr Phe
                165                 170                 175

Ala Glu Gly Val Val Ala Phe Leu Ile Leu Pro Gln Ala Lys Lys Asp
            180                 185                 190

Phe Phe Ser Ser His Pro Leu Arg Glu Pro Val Asn Ala Thr Glu Asp
        195                 200                 205

Pro Ser Ser Gly Tyr Tyr Ser Thr Thr Ile Arg Tyr Gln Ala Thr Gly
    210                 215                 220

Phe Gly Thr Asn Glu Thr Glu Tyr Leu Phe Glu Val Asp Asn Leu Thr
225                 230                 235                 240

Tyr Val Gln Leu Glu Ser Arg Phe Thr Pro Gln Phe Leu Leu Gln Leu
                245                 250                 255

Asn Glu Thr Ile Tyr Ala Ser Gly Lys Arg Ser Asn Thr Thr Gly Lys
            260                 265                 270

Leu Ile Trp Lys Val Asn Pro Glu Ile Asp Thr Thr Ile Gly Glu Trp
        275                 280                 285

Ala Phe Trp Glu Thr Lys Lys Asn Leu Thr Arg Lys Ile Arg Ser Glu
    290                 295                 300

Glu Leu Ser Phe Thr Ala Val Ser Asn Gly Pro Lys Asn Ile Ser Gly
```

```
305                 310                 315                 320

Gln Ser Pro Ala Arg Thr Ser Ser Asp Pro Glu Thr Asn Thr Thr Asn
                325                 330                 335

Glu Asp His Lys Ile Met Ala Ser Glu Asn Ser Ser Ala Met Val Gln
            340                 345                 350

Val His Ser Gln Gly Arg Lys Ala Ala Val Ser His Leu Thr Thr Leu
        355                 360                 365

Ala Thr Ile Ser Thr Ser Pro Gln Pro Pro Thr Thr Lys Thr Gly Pro
    370                 375                 380

Asp Asn Ser Thr His Asn Thr Pro Val Tyr Lys Leu Asp Ile Ser Glu
385                 390                 395                 400

Ala Thr Gln Val Gly Gln His His Arg Arg Ala Asp Asn Asp Ser Thr
                405                 410                 415

Ala Ser Asp Thr Pro Pro Ala Thr Thr Ala Ala Gly Pro Leu Lys Ala
            420                 425                 430

Glu Asn Thr Asn Thr Ser Lys Ser Ala Asp Ser Leu Asp Leu Ala Thr
        435                 440                 445

Thr Thr Ser Pro Gln Asn Tyr Ser Glu Thr Ala Gly Asn Asn Asn Thr
    450                 455                 460

His His Gln Asp Thr Gly Glu Glu Ser Ala Ser Ser Gly Lys Leu Gly
465                 470                 475                 480

Leu Ile Thr Asn Thr Ile Ala Gly Val Ala Gly Leu Ile Thr Gly Gly
                485                 490                 495

Arg Arg Thr Arg Arg Glu Val Ile Val Asn Ala Gln Pro Lys Cys Asn
            500                 505                 510

Pro Asn Leu His Tyr Trp Thr Thr Gln Asp Glu Gly Ala Ala Ile Gly
        515                 520                 525

Leu Ala Trp Ile Pro Tyr Phe Gly Pro Ala Ala Glu Gly Ile Tyr Thr
    530                 535                 540

Glu Gly Leu Met His Asn Gln Asp Gly Leu Ile Cys Gly Leu Arg Gln
545                 550                 555                 560

Leu Ala Asn Glu Thr Thr Gln Ala Leu Gln Leu Phe Leu Arg Ala Thr
                565                 570                 575

Thr Glu Leu Arg Thr Phe Ser Ile Leu Asn Arg Lys Ala Ile Asp Phe
            580                 585                 590

Leu Leu Gln Arg Trp Gly Gly Thr Cys His Ile Leu Gly Pro Asp Cys
        595                 600                 605

Cys Ile Glu Pro His Asp Trp Thr Lys Asn Ile Thr Asp Arg Ile Asp
    610                 615                 620

Gln Ile Ile His Asp Phe Val Asp Lys Thr Leu Pro Asp Gln Gly Asp
625                 630                 635                 640

Asn Asp Asn Trp Trp Thr Gly Trp Arg Gln Trp Ile Pro Ala Gly Ile
                645                 650                 655

Gly Val Thr Gly Val Ile Ile Ala Val Ile Ala Leu Phe Cys Ile Cys
            660                 665                 670

Lys Phe Val Phe
        675


<210> SEQ ID NO 9
<211> LENGTH: 9
<212> TYPE: PRT
<213> ORGANISM: Yellow fever virus

<400> SEQUENCE: 9
```

```
Asp Gln Gly Cys Ala Ile Asn Phe Gly
1               5


<210> SEQ ID NO 10
<211> LENGTH: 23
<212> TYPE: PRT
<213> ORGANISM: West Nile virus

<400> SEQUENCE: 10

Arg Ser Ile Ala Met Thr Phe Leu Ala Val Gly Gly Val Leu Leu Phe
1               5                   10                  15

Leu Ser Val Asn Val His Ala
            20


<210> SEQ ID NO 11
<211> LENGTH: 10
<212> TYPE: PRT
<213> ORGANISM: Artificial Sequence
<220> FEATURE:
<223> OTHER INFORMATION: JUNCTION NS1 SIGNAL PEPTIDE EBOLA GLYCOPROTEIN

<400> SEQUENCE: 11

Ala Ile Asn Phe Gly Ile Pro Leu Gly Val
1               5                   10


<210> SEQ ID NO 12
<211> LENGTH: 10
<212> TYPE: PRT
<213> ORGANISM: Artificial Sequence
<220> FEATURE:
<223> OTHER INFORMATION: junction Ebola glycoprotein- WNV TM2 domain
      [SEQ ID NO:12]

<400> SEQUENCE: 12

Cys Lys Phe Val Phe Arg Ser Ile Ala Met
1               5                   10


<210> SEQ ID NO 13
<211> LENGTH: 10
<212> TYPE: PRT
<213> ORGANISM: Artificial Sequence
<220> FEATURE:
<223> OTHER INFORMATION: JUNCTION TM2 DOMAIN - NS1 PROTEIN

<400> SEQUENCE: 13

Val Asn Val His Ala Asp Gln Gly Cys Ala
1               5                   10


<210> SEQ ID NO 14
<211> LENGTH: 7
<212> TYPE: PRT
<213> ORGANISM: Artificial Sequence
<220> FEATURE:
<223> OTHER INFORMATION: fragment GP1

<400> SEQUENCE: 14

Ala Ala Ala Ala Ala Ala Ala
1               5
```

-continued

```
<210> SEQ ID NO 15
<211> LENGTH: 8
<212> TYPE: PRT
<213> ORGANISM: Artificial Sequence
<220> FEATURE:
<223> OTHER INFORMATION: gp1 fragment

<400> SEQUENCE: 15

Ala Ala Gly Ala Ala Gly Ala Ala
1               5
```

CHIMERIC FILOVIRUS VACCINES

CROSS REFERENCES TO RELATED APPLICATIONS

This application is a national-stage application under 35 U.S.C. § 371 of International Application No. PCT/EP2020/074701, filed Sep. 4, 2020, which International Application claims benefit of priority to European Patent Application No. 19197322.1, filed Sep. 13, 2019.

FIELD OF THE INVENTION

The invention relates to chimeric Flavivirus based vaccines. The invention further relates to vaccines against filoviruses such as Ebola.

BACKGROUND OF THE INVENTION

Currently, there is no licensed prophylaxis or treatment available against Ebola disease (EVD). The most advanced vaccine candidate against Ebola virus (EBOV) is a recombinant vesicular stomatitis Indiana virus (VSV) vectored vaccine expressing the Ebola glycoprotein (G protein or GP) from Zaire ebolavirus called rVSV-ZEBOV. This vaccine was approved to use in a ring vaccination in Guinea and also in Republic Democratic of Congo during the last outbreak in 2018 just in confirmed patients with EVD. In addition to rVSV-ZEBOV and, other approaches that have been used to generate a vaccine involve the use of human or chimpanzee adenovirus or modified vaccinia virus Ankara (MVA) as vector to express the Ebola GP. Some examples are Ad5-ZEBOV licensed in China, Ad.26-EBO-Z with or without MVA-BN-Filo (encodes Ebola virus, Sudan virus, Marburg virus glycoproteins and Tai Forest virus nucleoprotein).

Although a wide range of approaches had been developed to generate a Ebola vaccine, until now, yellow fever 17D has never been used as vector to engineer an Ebola vaccine. Chimeric YFV vectors are disclosed in Bredenbeek et al. (2006) *Virology* 345, 299-304 and Jiang et al. (2011) *Vaccine* 29, 1248-1257. In these constructs foreign antigens were inserted between YF-E/NS1. These constructs need to be transfected in cells and the viruses derived from them are used as vaccines.

Most of the main vaccine candidates mentioned above requires multiples doses to achieve a potent immune response and get full protection. In addition, the requirement of a cold chain to preserve them poses a significant obstacle to implement these vaccines in the African countries where are required. The ring vaccination with rVSV-ZEBOV which needs to be stored at −80 C, showed that might not be practical in the field. Besides, there are outstanding questions regarding the long-term safety and immunogenicity of the vaccine (McWilliams et al. (2019) *Cell reports* 26, 1718-1726.

SUMMARY OF THE INVENTION

The present invention discloses a live-attenuated yellow fever vaccine strain (YFV-17D) as vector to engineer a transgenic vaccine by inserting the Ebola glycoprotein (GP) from Makona strain between YF-E/NS1 as follows: the N-terminal (Nt) signal peptide (SP) of Ebola-GP was deleted, the first 9 amino acids of NS1 (27 nucleotides) were added Nt of Ebola-GP to allow proper release of Ebola-GP protein, the Ebola-GP cytoplasmatic domain was preserved and fused to the WNV transmembrane domain 2. The resulting plasmid launches viable live-attenuated viruses expressing functional Ebola-GP and YFV17D proteins. The plasmid is thermostable and can be used directly as vaccine, or as stable seed for production of a similar live vaccine in tissue culture or comparable substrate following transfection of said construct. The vaccine induced immune response against both Ebola and YFV after one-single shot. In addition, a second construct was generate in the same way but, in this case, the mucin like domain (MLD) of GP1 was deleted. Also constructs carrying the glycoprotein genes from different filoviruses (BDBV, SUDV, TAFV, RESTV, MARV, RAVV and MLAV) are being generated.

The present invention provides vaccine inducing Flavivirus (e.g. YFV) and filovirus (e.g. Ebola) virus specific immunity. The constructs can also be used as stable seed for the production of tissue culture-derived live-attenuated vaccine. Based on the YFV-Ebola constructs vaccines against other filoviruses (e.g. Marburg virus, MARV) can be generated against which no vaccines exist yes.

The invention is summarised in the following statements:

1. A polynucleotide comprising a sequence of a live, infectious, attenuated Flavivirus wherein a nucleotide sequence encoding at least a part of a Filovirus glycoprotein is located at the intergenic region between the E and NS1 gene of said Flavivirus, such that a chimeric virus is expressed, characterized in that the encoded sequence C terminally of the E protein of said Flavivirus and N terminally of the signal peptide of the NS1 protein of said Flavivirus comprises in the following order:
   - a further signal peptide of a Flavivirus NS1 protein,
   - a filovirus glycoprotein wherein the N terminal signal peptide is absent,
   - a TM domain of a flaviviral E protein (typically TM2).

2. The polynucleotide according to statement 1, wherein the mucin like domain (MLD) of the filovirus glycoprotein is absent.

3. The polynucleotide according to statement 1 or 2, wherein the Flavivirus is Yellow Fever virus, typically the YF17D strain.

4. The polynucleotide according to statement 1 or 2, wherein live, infectious, attenuated Flavivirus is a chimeric virus.

5. The polynucleotide according to any one of statements 1 to 4, wherein the filovirus is a mononegavirus.

6. The polynucleotide according to any one of statements 1 to 5, wherein the filovirus is selected from the group consisting of BDBV, SUDV, TAFV, RESTV, MARV, RAVV, MLAV.

7. The polynucleotide according to one of statements 1 to 5, wherein the filovirus in an Ebola virus.

8. The polynucleotide according to statement 7, wherein the Ebola virus is the Ebola Makona strain.

9. The polynucleotide according to any one of statements 1 to 8, wherein the nucleotide sequence of the glycoprotein is codon optimized for improved expression in mammalian cells.

10. The polynucleotide according to any one of statements 1 to 9, wherein the signal peptide of the NS1 protein of the live, infectious, attenuated Flavivirus, comprises or consists of the sequence DQGCAINFG [SEQ ID NO: 9].

11. The polynucleotide according to any one of statements 1 to 10, wherein the TM2 domain of a flaviviral E protein is from West Nile virus.

12. The polynucleotide according to any one of statements 1 to 11, wherein the TM2 domain of a flaviviral E protein has the sequence RSIAMTFLAVGGVLLFLSVNVHA [SEQ ID NO: 10].

13. The polynucleotide according to any one of statements 1 to 12, wherein the Glycoprotein lacks the N terminal signal sequence of SEQ ID NO 6.

14. The polynucleotide according to any one of statements 1 to 13, wherein the Glycoprotein lacks the mucin like domain of SEQ ID NO:7

15. The polynucleotide according to any one of statements 1 to 13, wherein the sequence of the chimeric virus comprises at the junction of Flavivirus E gene NS1 signal peptide and the Ebola glycoprotein the sequence of [SEQ ID NO:11].

16. The polynucleotide according to any one of statements 1 to 14, wherein the sequence of the chimeric virus comprises at the junction of the Ebola glycoprotein and the WNV TM2 domain the sequence of SEQ ID NO: 12].

17. The polynucleotide according to any one of statements 1 to, wherein the sequence of the chimeric virus comprises at the junction of the WNV TM2 domain and the NS1 protein the sequence of SEQ ID NO: 13].

In preferred embodiments the junctions connecting the flavirus NS1 signal sequence, the Filovirus G protein, the TM protein and the second NS1 signal sequence provide a fingerprint for the encoded proteins. Thus embodiments of encoded sequences can be defined by sequences having the sequence of SEQ ID NO:2 or SEQ ID NO: 4, comprising the sequences with SEQ ID NO: 11, SEQ ID: NO: 12 and SEQ ID NO: 13; and wherein outside SEQ ID NO: 11, SEQ ID: NO 12 and SEQ ID NO13, a number of amino acids may differ from SEQ ID NO:2 or SEQ ID NO:4, e.g. differing up to 20, up to 10, or up to 5 compared to SEQ ID NO:2 or SEQ ID NO: 4, or e.g. having a sequence identity of at least 95%, 96%, 97%, 98% or 99% with SEQ ID NO:2 or SEQ ID NO:4.

18. The polynucleotide according to any one of the statements 1 to 17, which is a bacterial artificial chromosome.

19. A polynucleotide in accordance to any one of statement 1 to 18, for use as a medicament.

20. The polynucleotide for use as a medicament in accordance with statement 19, wherein the medicament is a vaccine.

21. A polynucleotide sequence in accordance to any one of statement 1 to 18, for use in the vaccination against a Filovirus.

22. A chimeric live, infectious, attenuated Flavivirus wherein at least a part of a Filovirus glycoprotein is inserted located between the E and NS1 protein of said Flavivirus, such that C terminally of the E protein and N terminally of the signal peptide of the NS1 protein the virus comprises in the following order:

a) a further signal peptide of a Flavivirus NS1 protein, b) a filovirus glycoprotein protein lacking a functional signal peptide, and c) a TM domain of a flaviviral E protein.

23. A chimeric virus in accordance to statement 22, for use as a medicament.

24. A chimeric virus in accordance to statement 22, for use in the prevention of a filovirus infection.

25. A chimeric virus encoded by a nucleotide in accordance to statement 22, for use in the prevention of a filovirus and in the prevention of the Flavivirus infection.

26. A method of preparing a vaccine against a filovirus infection, comprising the steps of:

providing a BAC which comprises:

an inducible bacterial ori sequence for amplification of said BAC to more than 10 copies per bacterial cell, and a viral expression cassette comprising a cDNA of a yellow fever filovirus chimeric virus according to any one of statements 1 to 15, and comprising cis-regulatory elements for transcription of said viral cDNA in mammalian cells and for processing of the transcribed RNA into infectious RNA virus, transfecting mammalian cells with the BAC of step a) and passaging the infected cells, validating replicated virus of the transfected cells of step b) for virulence and the capacity of generating antibodies and inducing protection against rabies infection, cloning the virus validated in step c into a vector, and formulating the vector into a vaccine formulation.

27. The method according to statement 26, wherein the vector is BAC, which comprises an inducible bacterial ori sequence for amplification of said BAC to more than 10 copies per bacterial cell.

BRIEF DESCRIPTION OF THE DRAWINGS

FIG. 2A) Plaque phenotype of YFV17D-Ebola-GP compared to YFV17D. FIG. 2B) Virus stability: RT-PCR analysis of the virus samples harvested during serial passaging (in BHK-21J and VeroE6) of the YFV17D-Ebola-GP virus. C+, control positive PLLAV-YFV17D-Ebola-GP; -RT: RT-PCR reaction without reverse transcriptase; RNA: RT-PCR reaction with the virus RNA.

FIG. 3A) Schematic vaccination schedule. Ifnar(−/−) mice (n=5) were intraperitoneal (IP) or subcutaneous (SC) vaccinated with PLLAV-YFV17D-Ebola-GP (2.5 μg) or YFV17D-Ebola-GP (250 PFU). FIG. 3B) Humoral immune response in Ifnar(−/−) mice 28 days after vaccination with YFV17D-Ebola-GP (LAV) or PLLAV-YFV17D-Ebola-GP. Represented numbers are the amount of animals that show seroconversion according to an indirect immunofluorescence assay (IIFA) against Yellow Fever (Euroimmune) or Ebola (in-house).

FIG. 4A) Representative IFN-gamma ELISPOT wells after 48 hours of splenocyte stimulation with the indicated antigen. FIG. 4B) Spots per six hundred thousand splenocytes in IFN-gamma ELISPOT after 48 hours stimulation with the indicated antigen. For each mouse, samples were analysed in duplicates and values are normalized by subtracting the number of spots in control wells (ovalbumin stimulated).

FIGS. 5A-5C: FIG. 5A) Schematic vaccination schedule. FIG. 5B) Table showing the Ebola antibody titres in serum samples harvested at 28 days post-vaccination of ifnar(−/−) mice vaccinated with YFV17D-Ebola-GP. FIG. 5C) Representative pictures of HEK293T cells transfected with pCMV-Ebola-GP-IRES-GFP construct to express GFP (green) and Ebola GP that was stained in red with a commercial polyclonal antibody against Ebola-GP or with serum sample from ifnar(−/−) mice vaccinated with YFV17D-Ebola-GP.

FIG. 7A) Schematic vaccination schedule. FIG. 7B) Analysis of cellular immunity in vaccinated AG129 mice. Representative IFN gamma ELISPOT wells after 48 hours of stimulation of splenocytes with the indicated antigen. For each mouse, samples were analysed in duplicates and values are normalized by subtracting the number of spots in control wells (ovalbumin stimulated).

DETAILED DESCRIPTION

Figure 1A:
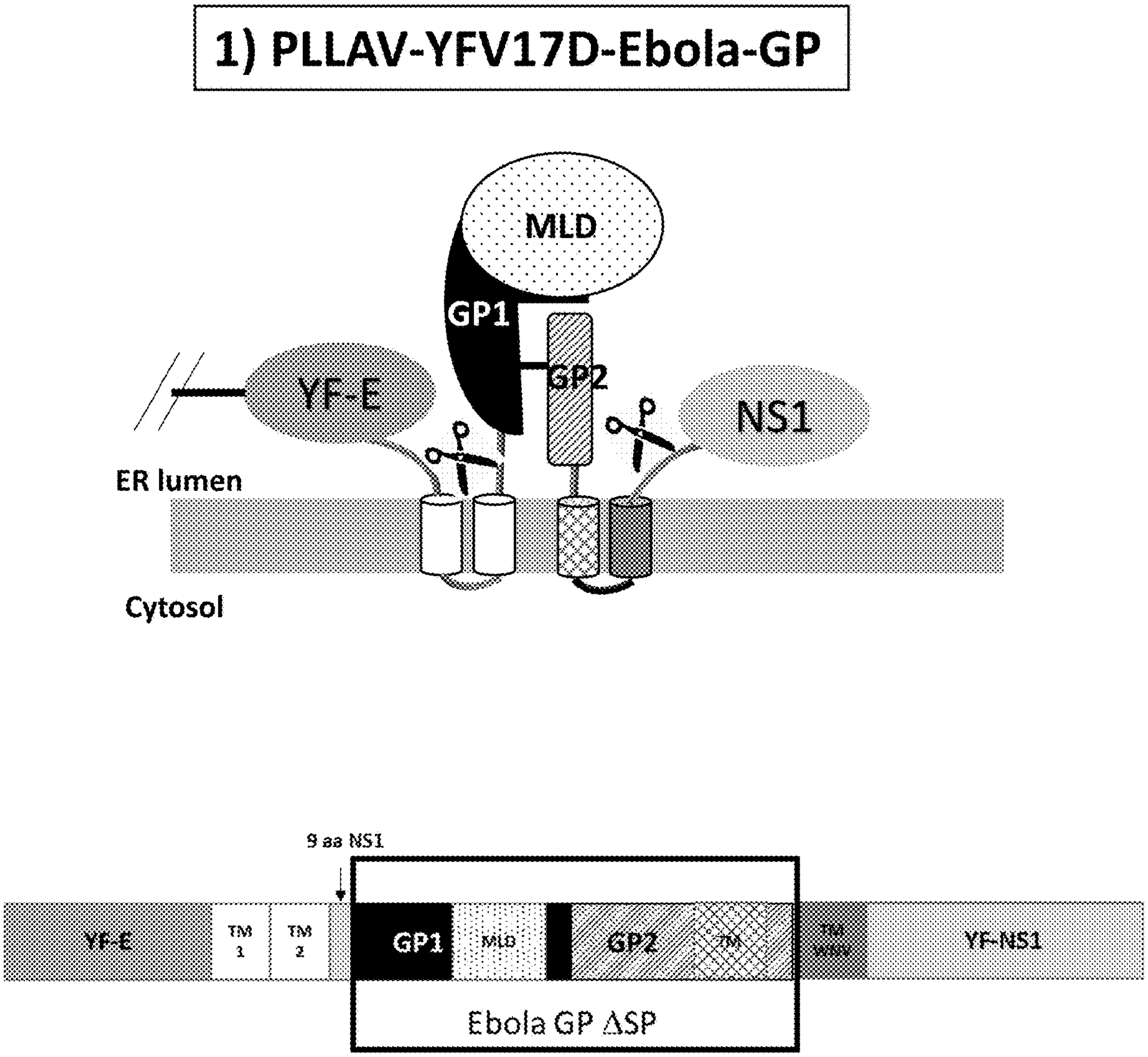
FIGS. 1A-1B: Schematic representation of 1) PLLAV-YFV17D-Ebola-GP (FIG. 1A) and 2) PLLAV-YFV17D-Ebola-deltaMLD (FIG. 1B).
Figure 1B:
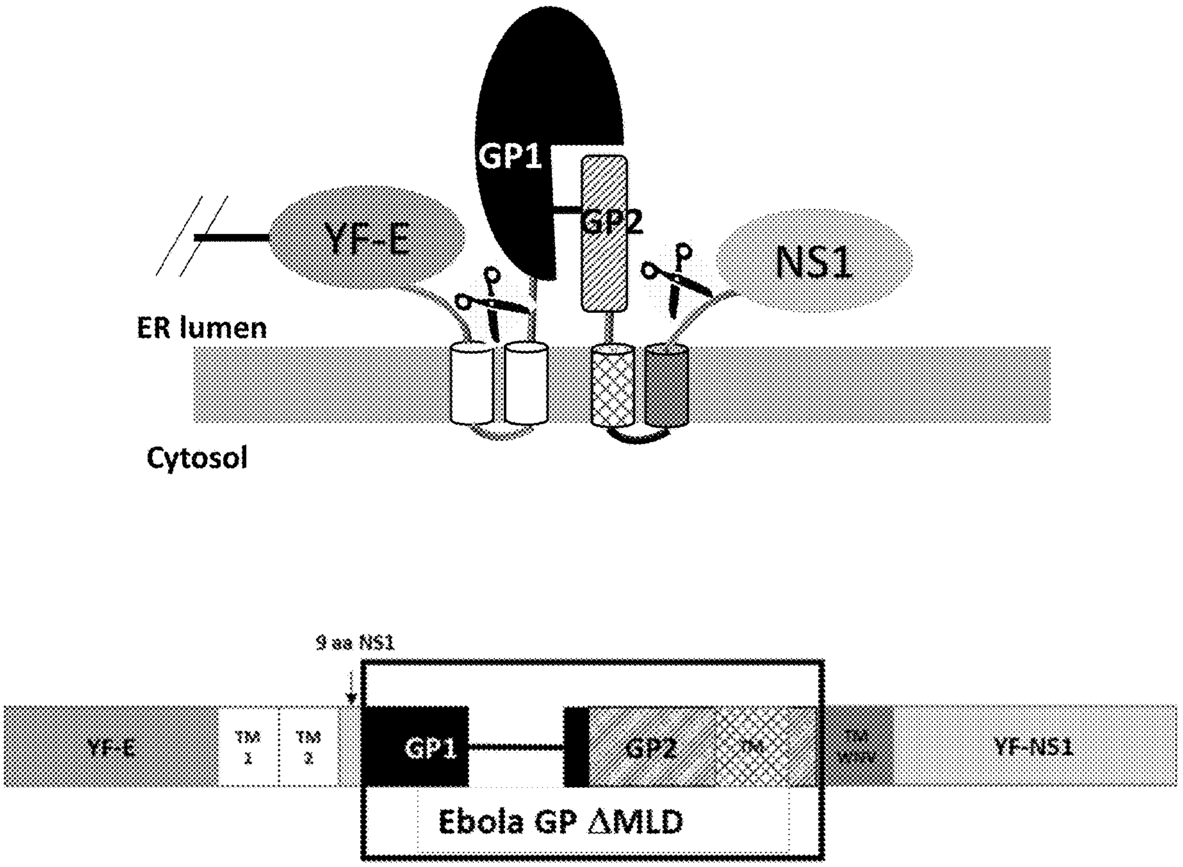

The present invention is exemplified for Yellow Fever virus, but is also applicable using other viral backbones of Flavivirus species such, but not limited to, Japanese Encephalitis, Dengue, Murray Valley Encephalitis (MVE), St. Louis Encephalitis (SLE), West Nile (WN), Tick-borne Encephalitis (TBE), Russian Spring-Summer Encephalitis (RSSE), Kunjin virus, Powassan virus, Kyasanur Forest Disease virus, Zika virus, Usutu virus, Wesselsbron and Omsk Hemorrhagic Fever virus.

The invention is further applicable to Flaviviridae, which comprises the genus Flavivirus but also the genera, Pegivirus, Hepacivirus and Pestivirus.

The genus Hepacivirus comprises e.g. Hepacivirus C (hepatitis C virus) and Hepacivirus B (GB virus B) The genus Pegivirus comprises e.g. Pegivirus A (GB virus A), Pegivirus C (GB virus C), and Pegivirus B (GB virus D).

The genus Pestivirus comprises e.g. Bovine virus diarrhea virus 1 and Classical swine fever virus (previously hog cholera virus).

The Flavivirus which is used as backbone can itself by a chimeric virus composed of parts of different Flaviviruses.

For example the C and NS1-5 region are from Yellow Fever and the prME region is of Japanese encephalitis or of Zika virus.

The present invention is exemplified for the G protein of Ebola virus but is also applicable to G proteins of other filoviruses. Filoviruses suitable in the context of the present invention are Cuevaviruses such as Lloviu cuevavirus (LLOV), Dianloviruses such as Mengla virus (MLAV), Ebolaviruses such as Bundibugyo Ebolavirus (BDBV), Reston ebolavirus (RESTV), Sudan ebolavirus (SUDV), Tai Forest ebolavirus (TAFV), Zaire ebolavirus (EBOV), and Marburgviruses such as Marburg virus (MARV) and Ravn virus (RAVV).

The present invention relates to nucleotide sequence and encoded proteins wherein within the copy DNA (cDNA) or RNA of a Flavivirus a glycoprotein of an filovirus is inserted (Also referred to as G protein or GP). The structure and function of Filovirus glycoproteins is reviewed for example in Marin et al. (2016) *Antiviral Res.* 135, 1-14.

The Ebola glycoprotein originates from a GP1,2 RNA transcript which codes for a GP0 precursor. mRNAs are then translated into the GP0 precursor, which transits through the endoplasmic reticulum and the Golgi apparatus, where it is cleaved by furin-like protease(s) into two proteins, GP1 and GP2. These two proteins together form a trimeric chalice structure made of three GP1 and three GP2 subunits assembled by GP1/GP2 and GP2/GP2 interactions. The bowl of the chalice is shaped by the GP1 subunits, while GP2 organizes and anchors the complex to the membrane. In the trimer, GP1,2s are bound to each other by disulfide bonds The ectodomain GP1 is constituted of a core protein and a mucin-like domain (MLD), which is largely glycosylated.

The core of GP1 is subdivided into three domains: the glycan cap, the head, and the base (Lee et al. (2008) *Nature* 454, 177-182). The glycan cap is the outer part of GP1 forming the chalice. The head supposedly helps structuring the metastable pre-fusion conformation. This part is exposed to the host membrane surface carrying the putative RBS. The base subdomain supports the linkage with GP2 and stabilizes the metastable pre-fusion conformation.

The trans-membrane GP2 protein anchors the complex to the viral membrane, but also manages virus entry and fusion. Its structure incorporates a transmembrane domain, a short cytoplasmic tail, an internal fusion loop defined by a disulfide bound between GP2 Cys511 and Cys556, and two heptad repeat regions (HRR1 and HRR2) surrounding the fusion peptide. This domain constitutes the unstable pre-fusion conformation of GP2, which rearranges itself at low pH to trigger fusion.

To maintain the structure in the pre-fusion state, the GP1 head packs the GP2 hydrophobic fusion peptide and stabilizes GP2.

The constructs of the present invention allow a proper presentation of the encoded insert into the ER and its proteolytic processing.

The invention is now further described for embodiments wherein a Flavivirus is used as backbone and a G protein of Ebola virus as insert.

The high sequence identity between G proteins of different filoviruses presents no problems to the skilled person to identify in related sequences the sequence elements corresponding to those present in Ebola virus G protein.

Flaviviruses have a positive single-strand RNA genome of approximately 11,000 nucleotides in length. The genome contains a 5' untranslated region (UTR), a long open-reading frame (ORF), and a 3' UTR. The ORF encodes three structural (capsid [C], precursor membrane [prM], and envelope [E]) and seven non-structural (NS1, NS2A, NS2B, NS3, NS4A, NS4B, and NS5) proteins. Along with genomic RNA, the structural proteins form viral particles. The non-structural proteins participate in viral polyprotein processing, replication, virion assembly, and evasion of host immune response. The signal peptide at the C terminus of the C protein (C-signal peptide; also called C-anchor domain) regulates Flavivirus packaging through coordination of sequential cleavages at the N terminus (by viral NS2B/NS3 protease in the cytoplasm) and C terminus (by host signalase in the endoplasmic reticulum [ER] lumen) of the signal peptide sequence.

The positive-sense single-stranded genome is translated into a single polyprotein that is co- and post translationally cleaved by viral and host proteins into three structural [Capsid (C), premembrane (prM), envelope (E)], and seven non-structural (NS1, NS2A, NS2B, NS3, NS4A, NS4B, NS5) proteins. The structural proteins are responsible for forming the (spherical) structure of the virion, initiating virion adhesion, internalization and viral RNA release into cells, thereby initiating the virus life cycle. The non-structural proteins on the other hand are responsible for viral replication, modulation and evasion of immune responses in infected cells, and the transmission of viruses to mosquitoes. The intra- and inter-molecular interactions between the structural and non-structural proteins play key roles in the virus infection and pathogenesis.

Figure 6A:
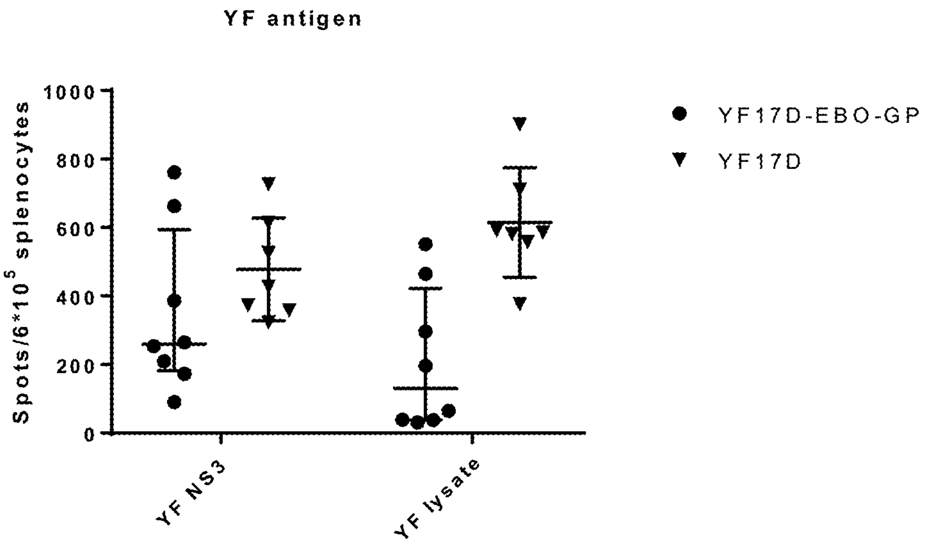
FIG. 6: Spots per six hundred thousand splenocytes in IFN-gamma ELISPOT after 48 hours of stimulation with the indicated antigen. For each mouse, samples were analysed in duplicates and values are normalized by subtracting the number of spots in control wells (ovalbumin stimulated).
Figure 6B:
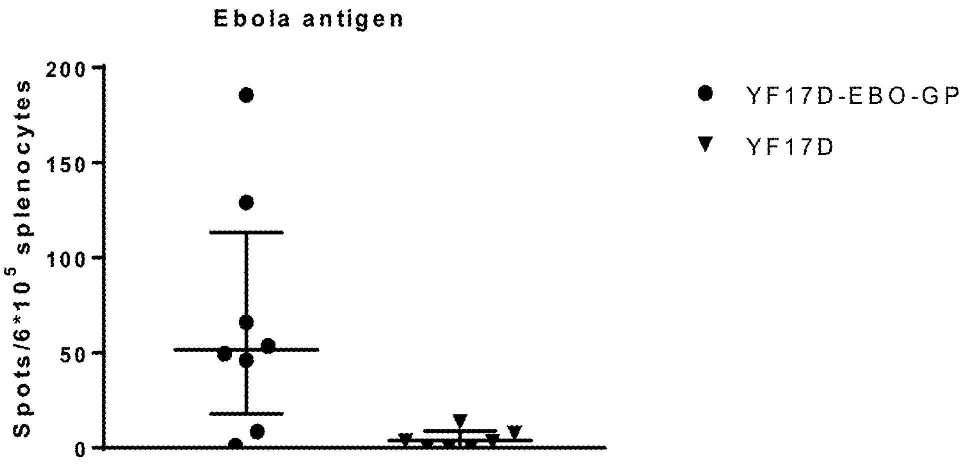

The E protein comprises at its C terminal end two transmembrane sequences, indicated as TM1 and TM2 in e.g. FIG. 6.

NS1 is translocated into the lumen of the ER via a signal sequence corresponding to the final 24 amino acids of E and is released from E at its amino terminus via cleavage by the ER resident host signal peptidase (Nowak et al. (1989) *Virology* 169, 365-376). The NS1 comprises at its C terminal a 8-9 amino acids signal sequence which contains a recognition site for a protease (Muller & Young (2013) *Antiviral Res.* 98, 192-208)

The constructs of the present invention are chimeric viruses wherein an Ebola G protein is inserted at the boundary between the E and NS1 protein. However additional sequence elements are provided N terminally and C terminally of the G protein insert.

The invention relates to polynucleotide comprising a sequence of a live, infectious, attenuated Flavivirus wherein a nucleotide sequence encoding at least a part of a filovirus G protein is inserted at the intergenic region between the E and NS1 gene of said Flavivirus, such that a chimeric virus is expressed, characterised in that the encoded sequence C terminally of the E protein of said Flavivirus and N terminal the NS1 protein of said Flavivirus comprises in the following order:

- a sequence element allowing the proteolytic processing of the G protein from the E protein by a signal peptidase.
  - a G protein wherein the signal peptide said G protein is absent, and optionally the mucin like domain of the G protein is absent, and
  - a TM transmembrane of a flavirus, typically a TM2 domain, typically a West Nile virus TM 2 domain To allow proteolytic processing of the Filovirus G protein from the Flavivirus E protein at its aminoterminal end and allow proteolytic processing of the filovirus G protein from the Flavivirus NS1 protein at its C terminal, sequence elements are provided which are substrates for a signal peptidase. These can vary in length and in sequence, and can be as short as one amino acid as shown in Jang et al. cited above. A discussion on suitable recognition sites for signalling proteases is found in Nielsen et al. (1997) *Protein Eng.* 10, 1-6.

Typically, at the C terminus of the G protein, the signal peptide at the N terminus of the NS1 protein will be used (or a fragment which allows proteolytic processing).

Typically, at the N terminus of the G protein, the same signal peptide (or fragment) of the NS1 protein of the Flavivirus backbone is introduced.

The invention equally relates to polynucleotides comprising a sequence of a live, infectious, attenuated Flavivirus. Herein a nucleotide sequence encoding at least a part of a filovirus G protein is inserted at the intergenic region between the E and NS1 gene of said Flavivirus. Additional sequences are provided such that when the chimeric virus is expressed such that the encoded sequence from the C terminally of the E protein to the N terminus of the signal peptide of the NS1 protein comprises in the following order:

a further signal peptide (or cleavable fragment thereof) of a Flavivirus NS1 gene, C terminal to the E protein and N terminal to the NS1 protein.

a filovirus G protein comprising a defective functional signal peptide or lacking a functional signal peptide, This G protein is C terminally positioned from a NS1 signal peptide. C terminally of the G protein is the sequence of a Flavivirus TM2 transmembrane domain of a Flavivirus. C terminally of this TM2 sequence follows the NS1 protein, including its native signal peptide sequence.

Thus, the G protein and the TM2 domain are flanked at N terminus and C terminus by an NS1 sequence. In the embodiments disclosed in the examples the protein and DNA sequence of both NS1 are identical.

In typical embodiments both NS1 signal sequences have the sequence DQGCAINFG [SEQ ID NO:9].

The constructs of the present invention did not show recombination due to the presence of this repetitive sequence. Sequence modifications can be introduced or NS1 sequences from different Flavivirus can be used to avoid presence of identical sequences, as long as the encoded peptide remains a target from the protease which processes these NS1 N-terminal signal sequences.

In typical embodiments, as disclosed in the examples, the G protein is of Ebola virus, preferably of the Makona strain of Ebola virus.

To facilitate the production of virus in the mammalian hosts, the nucleotide sequence of the G protein is codon optimized.

It is submitted that minor sequence modifications in the G protein and in the C terminal tail can be introduced without loss of function of these sequence elements.

It has been found that the presence of a functional signal peptide of the G protein results in a selective pressure whereby a part of the G protein comprising its signal peptide is deleted or mutated. Thus the constructs of the present invention typically contain a defective G protein signal by partial or complete removal of this sequence or by the introduction of mutations which render the signal protein non-functional.

The TM domain which is located C terminally of the G protein and N terminally of the NS1 is generally of a Flavivirus, typically from the E protein, and more typical a TM2 domain of an E protein. In preferred embodiments this TM2 domain of an E protein is from a different Flavivirus than the virus forming the backbone. The examples of present invention describe the TM2 domain of the E protein of the West Nile virus. This domain has the sequence RSIAMTFLAVGGVLLFLSVNVHA [SEQ ID NO: 10].

In the examples section below and in the schematic representation all sequence elements form a continuous sequence without any intervening sequence elements. It is submitted that in between these sequence elements, additional amino acids may be present as long as the localisation of the protein at either the ER lumen or cytosol is not disturbed and proteolytic processing is maintained.

The above described nucleotide sequence can be that of the virus itself or can refer to a sequence in a vector. A suitable vector for cloning Flavivirus and chimeric version are Bacterial Artificial Chromosomes, as describe in more detail below.

The methods and compounds of the present invention have medicinal application, whereby the virus or a vector encoding the virus can be used to vaccinate against the filovirus which contains the G protein that was cloned in the Flavivirus. In addition, the proteins from the Flavivirus equally provide protection such that the compounds of the present invention can be used to vaccinate against a Flavivirus and a filovirus using a single virus or DNA vaccine.

The use of Bacterial Artificial Chromosomes, and especially the use of inducible BACS as disclosed by the present inventors in WO2014174078, is particularly suitable for high yield, high quality amplification of cDNA of RNA viruses such as chimeric constructs of the present invention.

A BAC as described in this publication BAC comprises:

- an inducible bacterial ori sequence for amplification of said BAC to more than 10 copies per bacterial cell, and
- a viral expression cassette comprising a cDNA of an the RNA virus genome and comprising cis-regulatory elements for transcription of said viral cDNA in mammalian cells and for processing of the transcribed RNA into infectious RNA virus.

As is the case in the present invention the RNA virus genome is a chimeric viral cDNA construct of an RNA virus genome and a filovirus G protein.

In these BACS, the viral expression cassette comprises a cDNA of a positive-strand RNA virus genome, an typically a RNA polymerase driven promoter preceding the 5' end of said cDNA for initiating the transcription of said cDNA, and an element for RNA self-cleaving following the 3' end of said cDNA for cleaving the RNA transcript of said viral cDNA at a set position.

The BAC may further comprise a yeast autonomously replicating sequence for shuttling to and maintaining said bacterial artificial chromosome in yeast. An example of a yeast ori sequence is the 2p plasmid origin or the ARS1 (autonomously replicating sequence 1) or functionally homologous derivatives thereof.

The RNA polymerase driven promoter of this first aspect of the invention can be an RNA polymerase II promoter, such as Cytomegalovirus Immediate Early (CMV-IE) promoter, or the Simian virus 40 promoter or functionally homologous derivatives thereof.

The RNA polymerase driven promoter can equally be an RNA polymerase I or III promoter.

The BAC may also comprise an element for RNA self-cleaving such as the cDNA of the genomic ribozyme of hepatitis delta virus or functionally homologous RNA elements.

The formulation of DNA into a vaccine preparation is known in the art and is described in detail in for example chapter 6 to 10 of "DNA Vaccines" Methods in Molecular Medicine Vol 127, (2006) Springer Saltzman, Shen and Brandsma (Eds.)

Humana Press. Totoma, N.J. and in chapter 61 Alternative vaccine delivery methods, P 1200-1231, of Vaccines (6th Edition) (2013) (Plotkin et al. Eds.). Details on acceptable carrier, diluents, excipient and adjuvant suitable in the preparation of DNA vaccines can also be found in WO2005042014, as indicated below.

"Acceptable carrier, diluent or excipient" refers to an additional substance that is acceptable for use in human and/or veterinary medicine, with particular regard to immunotherapy.

By way of example, an acceptable carrier, diluent or excipient may be a solid or liquid filler, diluent or encapsulating substance that may be safely used in systemic or topic administration. Depending upon the particular route of administration, a variety of carriers, well known in the art may be used. These carriers may be selected from a group including sugars, starches, cellulose and its derivatives, malt, gelatine, talc, calcium sulphate and carbonates, vegetable oils, synthetic oils, polyols, alginic acid, phosphate buffered solutions, emulsifiers, isotonic saline and salts such as mineral acid salts including hydrochlorides, bromides and sulphates, organic acids such as acetates, propionates and malonates and pyrogen-free water.

A useful reference describing pharmaceutically acceptable carriers, diluents and excipients is Remington's Pharmaceutical Sciences (Mack Publishing Co. N. J. USA, (1991)) which is incorporated herein by reference.

Any safe route of administration may be employed for providing a patient with the DNA vaccine. For example, oral, rectal, parenteral, sublingual, buccal, intravenous, intra-articular, intra-muscular, intra-dermal, subcutaneous, inhalational, intraocular, intraperitoneal, intracerebroventricular, transdermal and the like may be employed. Intramuscular and subcutaneous injection may be appropriate, for example, for administration of immunotherapeutic compositions, proteinaceous vaccines and nucleic acid vaccines. It is also contemplated that microparticle bombardment or electroporation may be particularly useful for delivery of nucleic acid vaccines.

Dosage forms include tablets, dispersions, suspensions, injections, solutions, syrups, troches, capsules, suppositories, aerosols, transdermal patches and the like. These dosage forms may also include injecting or implanting controlled releasing devices designed specifically for this purpose or other forms of implants modified to act additionally in this fashion. Controlled release of the therapeutic agent may be effected by coating the same, for example, with hydrophobic polymers including acrylic resins, waxes, higher aliphatic alcohols, polylactic and polyglycolic acids and certain cellulose derivatives such as hydroxypropylmethyl cellulose. In addition, the controlled release may be effected by using other polymer matrices, liposomes and/or microspheres.

DNA vaccines suitable for oral or parenteral administration may be presented as discrete units such as capsules, sachets or tablets each containing a pre-determined amount of plasmid DNA, as a powder or granules or as a solution or a suspension in an aqueous liquid, a non-aqueous liquid, an oil-in-water emulsion or a water-in-oil liquid emulsion. Such compositions may be prepared by any of the methods of pharmacy but all methods include the step of bringing into association one or more agents as described above with the carrier which constitutes one or more necessary ingredients. In general, the compositions are prepared by uniformly and intimately admixing the DNA plasmids with liquid carriers or finely divided solid carriers or both, and then, if necessary, shaping the product into the desired presentation.

The above compositions may be administered in a manner compatible with the dosage formulation, and in such amount as is effective. The dose administered to a patient, should be sufficient to effect a beneficial response in a patient over an appropriate period of time. The quantity of agent (s) to be administered may depend on the subject to be treated inclusive of the age, sex, weight and general health condition thereof, factors that will depend on the judgement of the practitioner.

Furthermore DNA vaccine may be delivered by bacterial transduction as using live-attenuated strain of *Salmonella* transformed with said DNA plasmids as exemplified by Darji et al. (2000) *FEMS Immunol Med Microbiol* 27, 341-349 and Cicin-Sain et al. (2003) *J Virol* 77, 8249-8255 given as reference.

Typically the DNA vaccines are used for prophylactic or therapeutic immunisation of humans, but can for certain viruses also be applied on vertebrate animals (typically mammals, birds and fish) including domestic animals such as livestock and companion animals. The vaccination is envisaged of animals which are a live reservoir of viruses (zoonosis) such as monkeys, dogs, mice, rats, birds and bats. In certain embodiments vaccines may include an adjuvant, i.e. one or more substances that enhances the immunogenicity and/or efficacy of a vaccine composition However, life vaccines may eventually be harmed by adjuvants that may stimulate innate immune response independent of viral replication. Non-limiting examples of suitable adjuvants include squalane and squalene (or other oils of animal origin); block copolymers; detergents such as Tween-80; Quill A, mineral oils such as Drakeol or Marcol, vegetable oils such as peanut oil; *Corynebacterium*-derived adjuvants such as *Corynebacterium parvum; Propionibacterium*-derived adjuvants such as *Propionibacterium acne; Mycobacterium bovis* (Bacille Calmette and Guerin or BCG); interleukins such as interleukin 2 and interleukin 12; monokines such as interleukin 1; tumour necrosis factor; interferons such as gamma interferon; combinations such as saponin-aluminium hydroxide or Quil-A aluminium hydroxide; liposomes; ISCOMt) and ISCOMATRIX (B) adjuvant; mycobacterial cell wall extract; synthetic glycopeptides such as muramyl dipeptides or other derivatives; Avridine; Lipid A derivatives; dextran sulfate; DEAE-Dextran or with aluminium phosphate; carboxypolymethylene such as Carbopol'EMA; acrylic copolymer emulsions such as Neocryl A640; vaccinia or animal poxvirus proteins; sub-viral particle adjuvants such as cholera toxin, or mixtures thereof.

EXAMPLES

Example 1 YFV17D/Ebola Constructs

The Ebola glycoprotein (GP) from Makona strain was inserted between YF-E/NS1 to generate two constructs as follows:

1) PLLAV-YFV17D-Ebola-GP: N-terminal (Nt) signal peptide (SP) was deleted, first 9 aminoacids of NS1 (27 nucleotides) were added Nt of Ebola-GP to allow proper release of Ebola-GP protein, the Ebola-GP cytoplasmic domain was preserved and fused to the WNV transmembrane domain 2. The resulting PLLAV-YFV17D-Ebola-GP launches viable live-attenuated viruses expressing functional Ebola-GP and YFV17D proteins.

2) PLLAV-YFV17D-Ebola-deltaMLD: This construct is similar to the one described above but, in this case, the mucin like domain (MLD) of GP1 was deleted.

Note: Constructs carrying the glycoprotein genes from different filoviruses (BDBV, SUDV, TAFV, RESTV, MARV, RAVV and MLAV) were generated. In these constructs the corresponding GP gene is inserted in the same way as in PLLAV-YFV17D-Ebola-GP described above.

Example 2 Construct #1 PLLAV-YFV17D-Ebola-GP

Figure 2A:
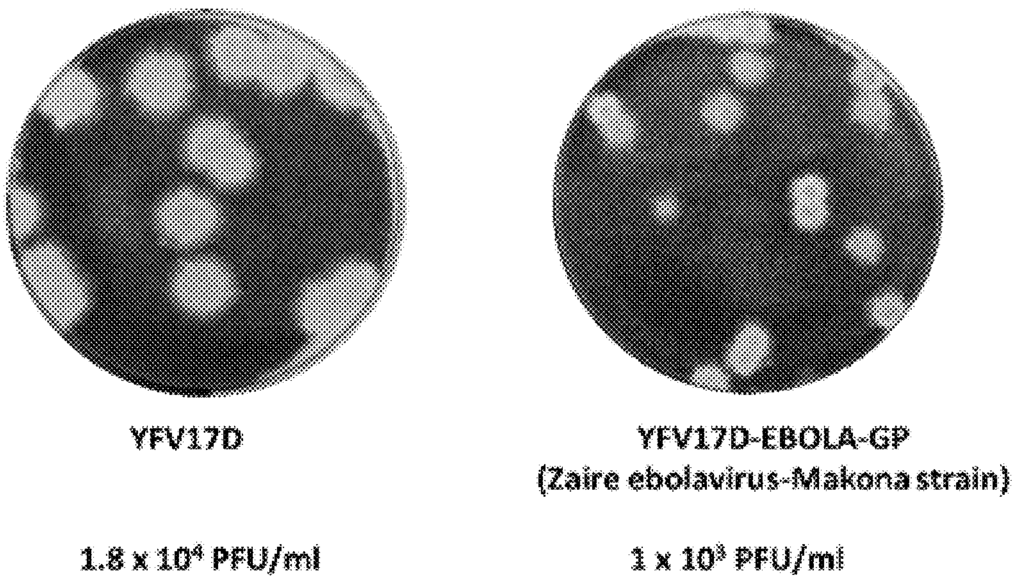
FIGS. 2A-2B.

PLLAV-YFV17D-Ebola-GP was transfected into BHK21J cells and typical CPE was observed as well as the virus supernatant harvested from them formed markedly smaller plaques compared to the plaque phenotype of YFV17D (FIG. 2A). Therefore, the resulting transgenic virus (YFV17D-Ebola-GP) is further attenuated, and virus yields were at least 10-fold less compared to YFV17D.

Figure 2B:
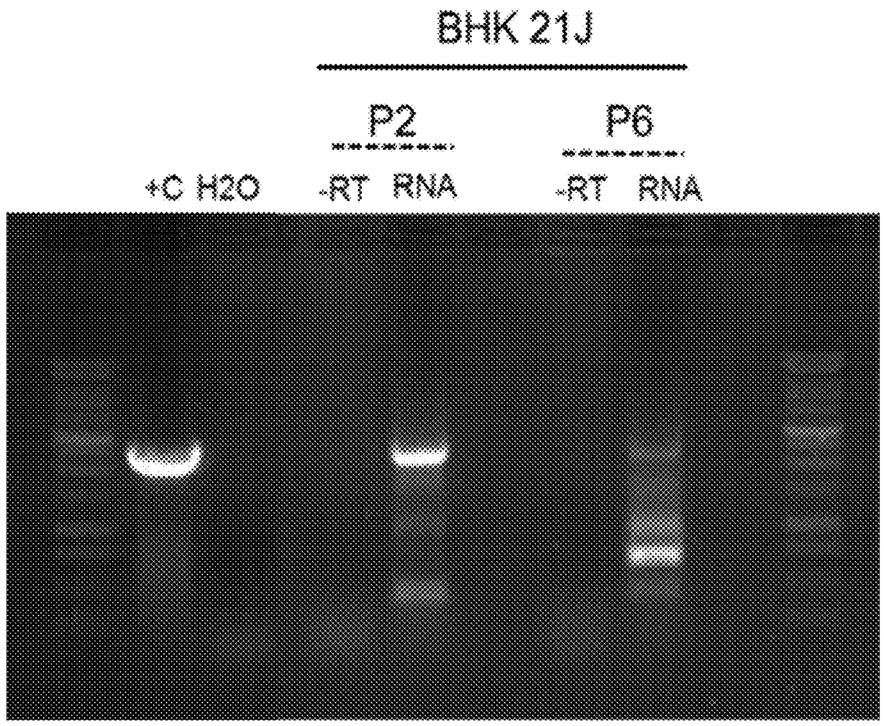

The stability of PLLAV-YFV17D-Ebola-GP was determined by performing RT-PCR to detect the transgene insert in virus samples that were harvested during serial passage of the YFV17D-Ebola-GP (FIG. 2B). Sequencing of the RT-PCR products showed that YFV17D-Ebola-GP insert with no mutations can be detected at least until passage 6 in BHK21J cells.

Figures 3A, 3B:
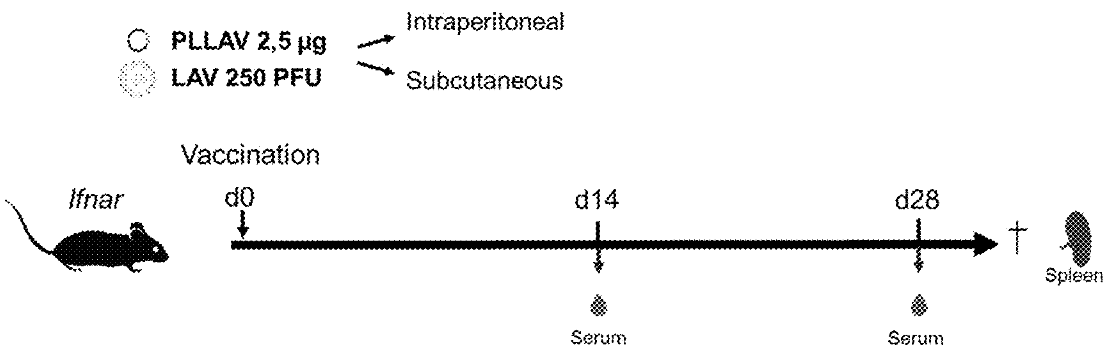
FIGS. 3A-3B.
Figure 4B:
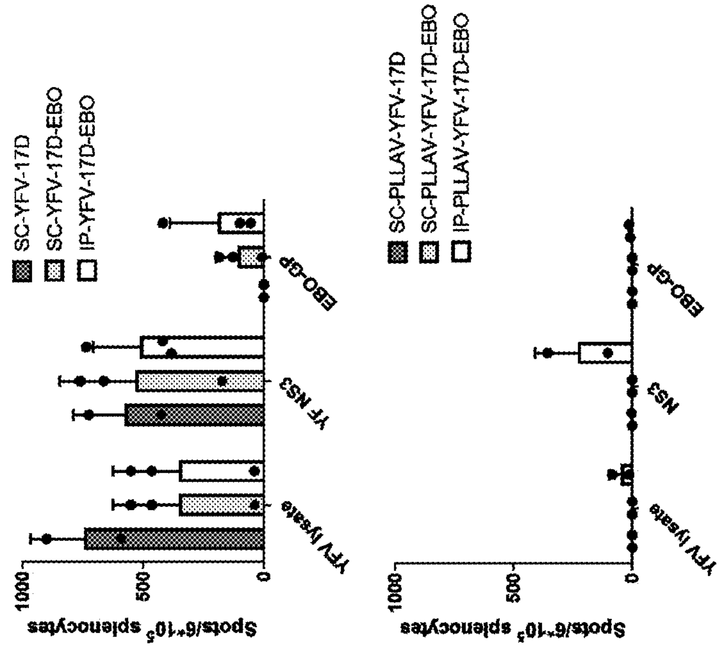
FIGS. 4A-4B: Analysis of cellular immunity in vaccinated Ifnar(−/−) mice.
Figure 4A:
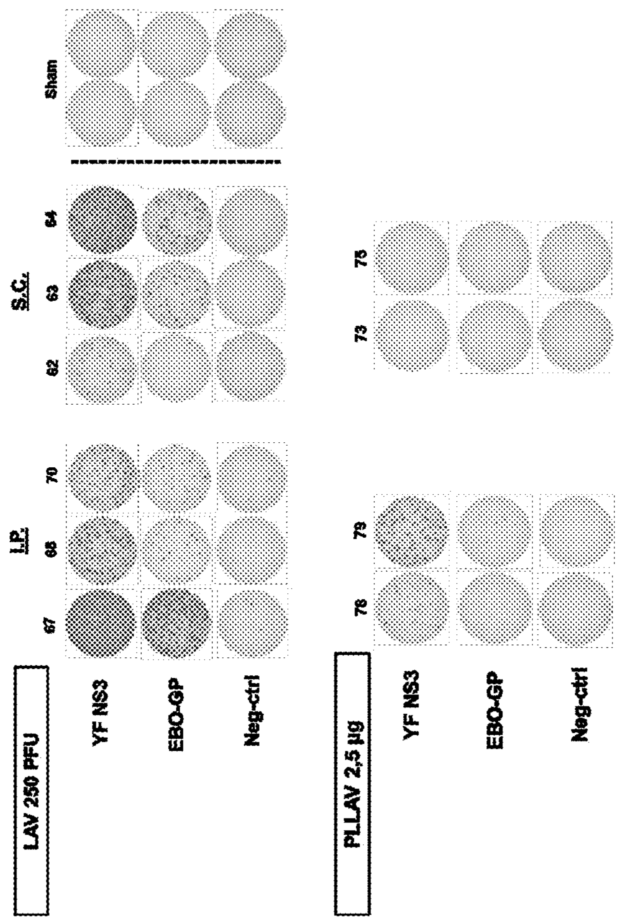

To determine the immunogenicity of PLLAV-YFV17D-Ebola-GP and the live-attenuated virus (LAV) version Ifnar knockout mice (n=5) were vaccinated with either PLLAV-YFV17D-Ebola-GP or the LAV intraperitoneally or subcutaneously (i.p. and s.c. respectively) (FIG. 3A). The YFV- and EBOV-specific antibody responses were quantified by indirect immunofluorescence assay (IIFA) and the cell mediated immune response was quantified by EliSPOT (FIGS. 3B and 4).

Vaccinated mice were monitored daily for morbidity/mortality and blood was sampled for serological analysis at baseline and with two-week intervals. The results showed that in all the animals vaccinated (i.p. or s.c.) with the LAV version specific binding antibodies were detected against both, YFV and EBOV. Regarding the mice vaccinated with PLLAV in 3 out of 5 of the mice vaccinated i.p. antibodies were detected against YFV and EBOV (FIG. 3B).

The analysis of the T cells immune response (FIG. 4) revealed that there was specific T cell responses after vaccination with YFV17D-Ebola-GP LAV (i.p. and s.c.) and the PLLAV version when his one was inoculated i.p. These results suggests that this is a bivalent vaccine that can induce dual immunity and protection against YFV and EBOV.

In a second experiment (FIG. 5A), ifnar mice (n=10) were vaccinated with YFV17D-Ebola-GP (250 PFU) and the specific antibody response against EBOV was determined by an in-house IIFA (FIG. 5C) (HEK293T cells were transfected with pCMV-Ebola-GP-IRES-GFP construct). The cellular immune response (IFN-gamma ELISPOT) was also analysed (FIG. 6). The results in FIG. 5A shows that in all animals vaccinated with YFV17D-Ebola-GP there were binding antibodies against EBOV (titres between 1:540 and 1:1620 dilution at 28 days post-vaccination). All the animals were seroconverted for YFV as well (data not shown). Concerning, the cellular immune response (FIG. 6), T cells responses against both, YFV and EBOV, were detected in the mice vaccinated with YFV17D-Ebola-GP. In all the control mice, vaccinated with YFV17D, as expected, only T cells responses against YFV were observed.

Figure 7A:
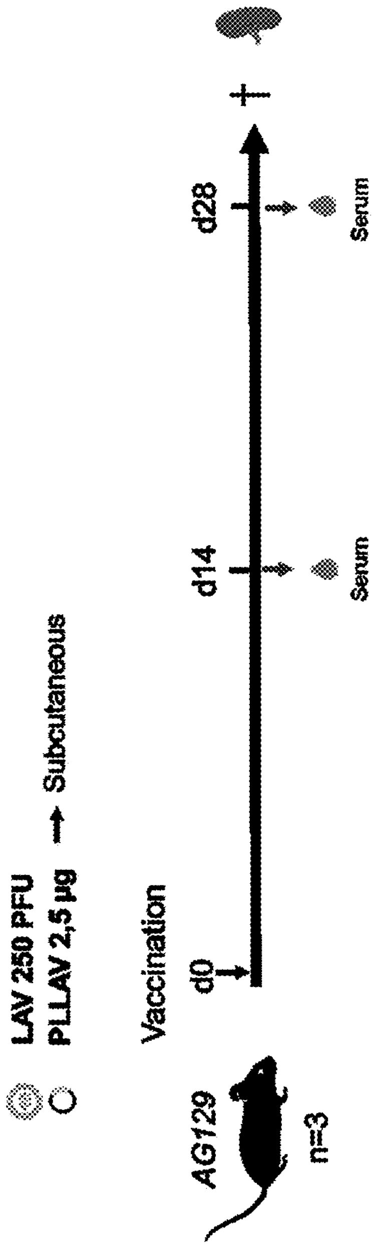
FIGS. 7A-7B.
Figure 7B:
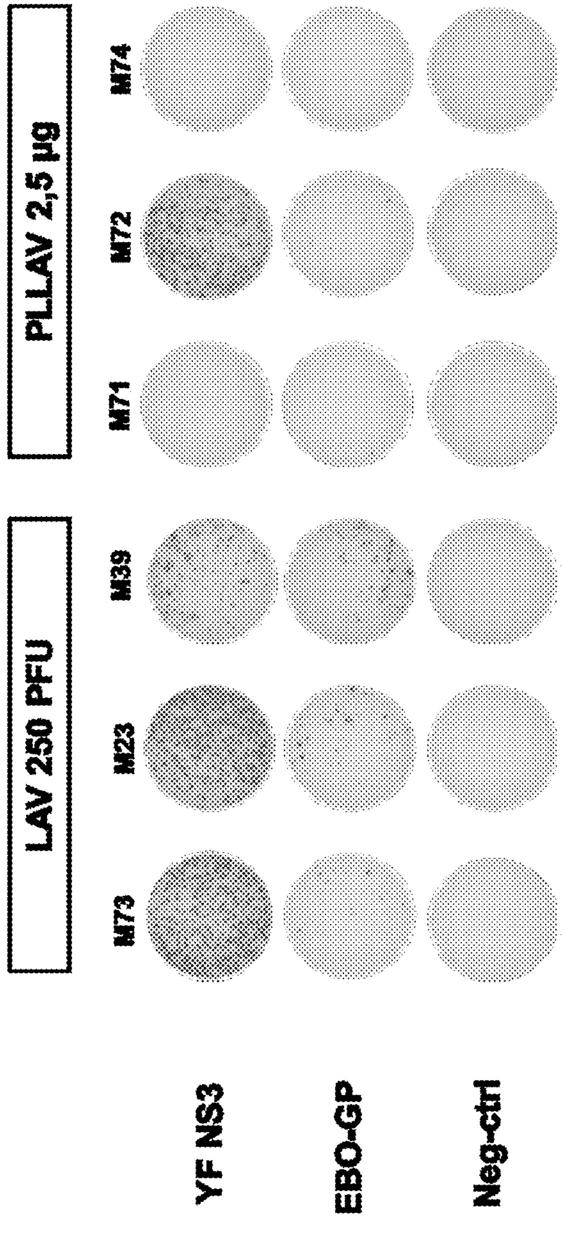

A third experiment evaluated the immune response in AG129 mice after vaccination with either PLLAV-YFV17D-Ebola-GP or its derived LAV (FIG. 7A)). The cell mediated immune response was evaluated at 28 days post infection by ELISpot (FIG. 7B). In all the mice vaccinated with LAV there was T cells responses against YFV and EBOV. However only in 1 out of 3 mice vaccinated with the PLLAV version a cellular immune response against YFV was observed but not against EBOV. Likely the plasmid was not deliver efficiently in these mice. Nevertheless induction of immunity by PLLAV-YFV17D-Ebola-GP at least in a fraction of mice, demonstrates in principle that the vaccine has the same antigenicity as the live virus vaccine derived thereof and can induce protection if used in the DNA modality as well.

```
SEQUENCES DEPICTED IN THE APPLICATION
Construct# Is PLLAV-YFV17D-EBOLA-GP (signal
peptide deleted and
cytoplasmic tail fused to WNV-TM2)
End YF-E (amino acids 1-40)
first 27 nucleotides/9 amino acids NS1,
(amino acids 41-49) Ebola-gp1 [without signal
 peptide and sequence AAAAAAA [SEQ ID
NO: 14] replaced by aaGaaGaA [SEQ ID NO: 15],
one extra A added to get the GP transmembrane version
of the protein)(amino acids 50-329)
```

-continued mucin like domain (MLD, 150 aa)/(amino acids 330-479)
furin cleavage site between GP1-GP2/EBOLA-GP2/
(amino acids 480-693)
WNV-TM2 (amino acids 694-716)
Beginning YF-NS1(amino acids 717-768)

SEQ ID NO: 1
SEQ ID NO: 2

AAGGTCATCATGGGGGCGGTACTTATATGGGTTGGCATCAACACAAGAAACATGACAATG
K V I M G A V L I W V G I N T R N M T M 20

TCCATGAGCATGATCTTGGTAGGAGTGATCATGATGTTTTTGTCTCTAGGAGTTGGcGCc
S M S M I L V G V I M M F L S L G V G A 40

GACCAGGGCTGCGCGATAAATTTCGGTatcccgcttggagttatccacaatagtacatta
D Q G C A I N F G I P L G V I H N S T L 60 caggttAgtgatgtcgacaaactagtttgtcgtgacaaactgtcatccacaaatcaattg
Q V S D V D K L V C R D K L S S T N Q L 80 agatcagttggactgaatctcgaggggaatggagtggcaactgacgtgccatctgtgact
R S V G L N L E G N G V A T D V P S V T 100 aaaagatggggcttcaggtccggtgtcccaccaaaggtggtcaattatgaagctggtgaa
K R W G F R S G V P P K V V N Y E A G E 120 tgggctgaaaactgctacaatcttgaaatcaaaaaacctgacgggagtgagtgtctacca
W A E N C Y N L E I K K P D G S E C L P 140 gcagcgccagacgggattcggggcttcccccggtgccggtatgtgcacaaagtatcagga
A A P D G I R G F P R C R Y V H K V S G 160 acgggaccatgtgccggagactttgccttccacaaagagggtgctttcttcctgtatgat
T G P C A G D F A F H K E G A F F L Y D 180 cgacttgcttccacagttatctaccgaggaacgactttcgctgaaggtgtcgttgcattt
R L A S T V I Y R G T T F A E G V V A F 200 ctgatactgccccaagctaagaaggacttcttcagctcacaccccttgagagagccggtc
L I L P Q A K K D F F S S H P L R E P V 220 aatgcaacggaggacccgtcgagtggctattattctaccacaattagatatcaggctacc
N A T E D P S S G Y Y S T T I R Y Q A T 240 ggttttggaactaatgagacagagtacttgttcgaggttgacaatttgacctacgtccaa
G F G T N E T E Y L F E V D N L T Y V Q 260 cttgaatcaagattcacaccacagtttctgctccagctgaatgagacaatatatgcaagt
L E S R F T P Q F L L Q L N E T I Y A S 280 gggaagaggagcaacaccacgggaaaactaatttggaaggtcaaccccgaaattgataca
G K R S N T T G K L I W K V N P E I D T 300 acaatcggggagtgggccttctgggaaactaaGaaGaAcctcactagaaaaattcgcagt
T I G E W A F W E T K K N L T R K I R S 320 gaagagttgtctttcacagctgtatcaaacggAcccaaaaacatcagtggtcagagtccg
E E L S F T A V S n g p k n i s g q s p 340 gcgcgaacttcttccgacccagagaccaacacaacaaatgaagaccacaaaatcatggct
a r t s s d p e t n t t n e d h k i m a 360 tcagaaaattcctgtgcaatggttcaagtgcacagtcaaggaaggaaagctgcagtgtcg
s e n s s a m v q v h s q g r k a a v s 380 catctgacaacccttgccacaatctccacgagtcctcaacctcccacaaccaaaacaggt
h l t t l a t i s t s p q p p t t k t g 400 ccggacaacagcacccataatacacccgtgtataaacttgacatctctgaggcaactcaa
p d n s t h n t p v y k l d i s e a t q 420 gttggacaacatcaccgtagagcagacaacgacagcacagcctccgacactcccccgcc
v g q h h r r a d n d s t a s d t p p a 440 acgaccgcagccggacccttaaaagcagagaacaccaacacgagtaagagcgctgactcc
t t a a g p l k a e n t n t s k s a d s 460 ctggacctcgccaccacgacaagcccccaaaactacagcgagactgctggcaacaac
l d l a t t t s p q n y s e t a g n n 480 actcatcaccaagataccggagaagagagtgccagcagcgggaagctaggcttaattacc
t h h q d t g c c s a s s g k l g l i t 500

-continued aatactattgctggagtagcaggactgatcacaggcgggagaaggactcgaaga*GAAGTA*
 n  t  i  a  g  v  a  g  l  i  t  g  g  r  R  T  R  R  *E  V*  520

*ATTGTCAATGCTCAACCCAAATGCAACCCCAATTTACATTACTGGACTACTCAGGATGAA*
 *I  V  N  A  Q  P  K  C  N  P  N  L  H  Y  W  T  T  Q  D  E*  540

*GGTGCTGCAATCGGATTGGCCTGGATACCATATTTCGGGCCAGCAGCCGAAGGAATTTAC*
 *G  A  A  I  G  L  A  W  I  P  Y  F  G  P  A  A  E  G  I  Y*  560

*ACAGAGGGGCTAATGCACAACCAAGATGGTTTAATCTGTGGGTTGAGGCAGCTGGCCAAC*
 *T  E  G  L  M  H  N  Q  D  G  L  I  C  G  L  R  Q  L  A  N*  580

*GAAACGACTCAAGCTCTCCAACTGTTCCTGAGAGCCACAACTGAGCTGCGAACCTTTTCA*
 *E  T  T  Q  A  L  Q  L  F  L  R  A  T  T  E  L  R  T  F  S*  600

*ATCCTCAACCGTAAGGCAATTGACTTCCTGCTGCAGCGATGGGGTGGCACATGCCACATT*
 *I  L  N  R  K  A  I  D  F  L  L  Q  R  W  G  G  T  C  H  I*  620

*TTGGGACCGGACTGCTGTATCGAACCACATGATTGGACCAAGAACATAACAGACAAAATT*
 *L  G  P  D  C  C  I  E  P  H  D  W  T  K  N  I  T  D  K  I*  640

*GATCAGATTATTCATGATTTTGTTGATAAAACCCTTCCGGACCAGGGGGACAATGACAAT*
 *D  Q  I  I  H  D  F  V  D  K  T  L  P  D  Q  G  D  N  D  N*  660

*TGGTGGACAGGATGGAGACAATGGATACCGGCAGGTATTGGAGTTACAGGTGTTATAATT*
 *W  W  T  G  W  R  Q  W  I  P  A  G  I  G  V  T  G  V  I  I*  680

*GCAGTTATCGCTTTATTCTGTATATGCAAATTTGTCTTT*AGGTCAATTGCTATGACGTTT
 A  V  I  A  L  F  C  I  C  K  F  V  F  R  S  I  A  M  T  F  700

CTTGCGGTTGGAGGAGTTTTGCTCTTCCTTTCGGTCAACGTCCATGCTGATCAAGGATGC
 L  A  V  G  G  V  L  L  F  L  S  V  N  V  H  A  D  Q  G  C  720

GCCATCAACTTTGGCAAGAGAGAGCTCAAGTGCGGAGATGGTATCTTCATATTTAGAGAC
 A  I  N  F  G  K  R  E  L  K  C  G  D  G  I  F  I  F  R  D  740

TCTGATGACTGGCTGAACAAGTACTCATACTATCCAGAAGATCCTGTGAAGCTTGCATCA
 S  D  D  W  L  N  K  Y  S  Y  Y  P  E  D  P  V  K  L  A  S  760

ATAGTGAAAGCCTCTTTTGAAGAA
 I  V  K  A  S  F  E  E  768

Construct# 2: PLLAV-YFV17D-EBOLA-GP MLD (signal peptide
and mucin like domain (MLD, 150aa from aa 312 to 462)
deleted, cytoplasmic tail fused to WNV-TM2)
End YF-E/ first 27 nucleotides NS1
(9 amino acids), (amino acids 41-49)
Ebola-gp1: [without signal peptide and sequence
AAAAAAA [SEQ ID NO: 14]
replaced by aaGaaGaA [SEQ ID NO: 15], one extra A
added to get the GP transmembrane version of the protein):
furin cleavage site between
GP1-GP2/ (amino acids 50-**)
EBOLA-GP2 (amino acids **-693)
WNV-TM2: (amino acids 694-716)
Beginning YF-NS1: (amino acids 717-768)

SEQ ID NO: 3
SEQ ID NO: 4

AAGGTCATCATGGGGGCGGTACTTATATGGGTTGGCATCAACACAAGAAACATGACAATG
 K  V  I  M  G  A  V  L  I  W  V  G  I  N  T  R  N  M  T  M  20

TCCATGAGCATGATCTTGGTAGGAGTGATCATGATGTTTTTGTCTCTAGGAGTTGGcGCc
 S  M  S  M  I  L  V  G  V  I  M  M  F  L  S  L  G  V  G  A  40
GACCAGGGCTGCGCGATAAATTTCGGTatcccgcttggagttatccacaatagtacatta
 D  Q  G  C  A  I  N  F  G  I  P  L  G  V  I  H  N  S  T  L  60

Caggttagtgatgtcgacaaactagtttgtcgtgacaaactgtcatccacaaatcaattg
 Q  V  S  D  V  D  K  L  V  C  R  D  K  L  S  S  T  N  Q  L  80

Agatcagttggactgaatctcgaggggaatggagtggcaactgacgtgccatctgtgact
 R  S  V  G  L  N  L  E  G  N  G  V  A  T  D  V  P  S  V  T  100

Aaaagatggggcttcaggtccggtgtcccaccaaaggtggtcaattatgaagctggtgaa
 K  R  W  G  F  R  S  G  V  P  P  K  V  V  N  Y  E  A  G  E  120

Tgggctgaaaactgctacaatcttgaaatcaaaaaacctgacgggagtgagtgtctacca
 W  A  E  N  C  Y  N  L  E  I  K  K  P  D  G  S  E  C  L  P  140

Gcagcgccagacgggattcggggcttcccccggtgccggtatgtgcacaaagtatcagga
 A  A  P  D  G  I  R  G  F  P  R  C  R  Y  V  H  K  V  S  G  160

-continued

Acgggaccatgtgccggagactttgccttccacaaagagggtgctttcttcctgtatgat
T G P C A G D F A F H K E G A F F L Y D 180

Cgacttgcttccacagttatctaccgaggaacgactttcgctgaaggtgtcgttgcattt
R L A S T V I Y R G T T F A E G V V A F 200

Ctgatactgccccaagctaagaaggacttcttcagctcacacccccttgagagagccggtc
L I L P Q A K K D F F S S H P L R E P V 220

Aatgcaacggaggacccgtcgagtggctattattctaccacaattagatatcaggctacc
N A T E D P S S G Y Y S T T I R Y Q A T 240

Ggttttggaactaatgagacagagtacttgttcgaggttgacaatttgacctacgtccaa
G F G T N E T E Y L F E V D N L T Y V Q 260

Cttgaatcaagattcacaccacagtttctgctccagctgaatgagacaatatatgcaagt
L E S R F T P Q F L L Q L N E T I Y A S 280

Gggaagaggagcaacaccacgggaaaactaatttggaaggtcaaccccgaaattgataca
G K R S N T T G K L I W K V N P E I D T 300 acaatcggggagtgggccttctgggaaactaaGaaGaAcctcactagaaaaattcgcagt
T I G E W A F W E T K K N L T R K I R S 320 gaagagttgtctttcacagctgtatcaaacactcatcaccaagataccggagaagagagt
E E L S F T A V S N T H H Q D T G E E S 340 gccagcagcgggaagctaggcttaattaccaatactattgctggagtagcaggactgatc
A S S G K L G L I T N T I A G V A G L I 360 acaggcgggagaaggactcgaaga*GAAGTAATTGTCAATGCTCAACCCAAATGCAACCCC*
T G G R R T R R *E V I V N A Q P K C N P* 380

*AATTTACATTACTGGACTACTCAGGATGAAGGTGCTGCAATCGGATTGGCCTGGATACCA*
*N L H Y W T T Q D E G A A I G L A W I P* 400

*TATTTCGGGCCAGCAGCCGAAGGAATTTACACAGAGGGGCTAATGCACAACCAAGATGGT*
*Y F G P A A E G I Y T E G L M H N Q D G* 420

*TTAATCTGTGGGTTGAGGCAGCTGGCCAACGAAACGACTCAAGCTCTCCAACTGTTCCTG*
*L I C G L R Q L A N E T T Q A L Q L F L* 440

*AGAGCCACAACTGAGCTGCGAACCTTTTCAATCCTCAACCGTAAGGCAATTGACTTCCTG*
*R A T T E L R T F S I L N R K A I D F L* 460

*CTGCAGCGATGGGGTGGCACATGCCACATTTTGGGACCGGACTGCTGTATCGAACCACAT*
*L Q R W G G T C H I L G P D C C I E P H* 480

*GATTGGACCAAGAACATAACAGACAAAATTGATCAGATTATTCATGATTTTGTTGATAAA*
*D W T K N I T D K I D Q I I H D F V D K* 500

*ACCCTTCCGGACCAGGGGGACAATGACAATTGGTGGACAGGATGGAGACAATGGATACCG*
*T L P D Q G D N D N W W T G W R Q W I P* 520

*GCAGGTATTGGAGTTACAGGTGTTATAATTGCAGTTATCGCTTTATTCTGTATATGCAAA*
*A G I G V T G V I I A V I A L F C I C K* 540

*TTTGTCTTT*AGGTCAATTGCTATGACGTTTCTTGCGGTTGGAGGAGTTTTGCTCTTCCTT
F V F R S I A M T F L A V G G V L L F L 560

TCGGTCAACGTCCATGCTGATCAAGGATGCGCCATCAACTTTGGCAAGAGAGAGCTCAAG
S V N V H A D Q G C A I N F G K R E L K 580

TGCGGAGATGGTATCTTCATATTTAGAGACTCTGATGACTGGCTGAACAAGTACTCATAC
C G D G I F I F R D S D D W L N K Y S Y 600

TATCCAGAAGATCCTGTGAAGCTTGCATCAATAGTGAAAGCCTCTTTTGAAGAA
Y P E D P V K L A S I V K A S F E E 618

-continued

Nucleotide and amino acid sequence of deleted peptide

[SEQ ID NO: 5
[SEQ ID NO: 6]

```
ATGGGTGTTACAGGAATATTGCAGTTACCTCGTGATCGATTCAAGAGGACATCATTCTTT
 M  G  V  T  G  I  L  Q  L  P  R  D  R  F  K  R  T  S  F  F         20

CTTTGGGTAATTATCCTTTTCCAAAGAACATTTTCC                                32
 L  W  V  I  I  L  F  Q  R  T  F  S
```

Mucin like domain

[SEQ ID NO: 7]

```
NGPKNISGQS PARTSSDPET NTTNEDHKIM ASENSSAMVQ VHSQGRKAAV           50

SHLTTLATIS TSPQPPTTKT GPDNSTHNTP VYKLDISEAT QVGQHHRRAD          100

NDSTASDTPP ATTAAGPLKA ENTNTSKSAD SLDLATTTSP QNYSETAGNN          150
```

Ebolavirus glycoprotein

[SEQ ID NO: 8]

```
mgvtgilqlp rdrfkrtsff Iwviilfqrt fsiplgvihn stlqvsdvdk           50

Ivcrdklsst nqlrsvglnl egngvatdvp svtkrwgfrs gvppkvvnye          100

agewaencyn leikkpdgse clpaapdgir gfprcryvhk vsgtgpcagd          150

fafhkegaff lydrlastvi yrgttfaegv vaflilpqak kdffsshplr          200

epvnatedps sgyysttiry qatgfgtnet eylfevdnlt yvqlesrftp          250

qfllqlneti yasgkrsntt gkliwkvnpe idttigewaf wetkknitrk          300

irseelsfta vsngpknisg qspartssdp etnttnedhk imasenssam          350

vqvhsqgrka avshlttlat istspqpptt ktgpdnsthn tpvykldise          400

atqvgqhhrr adndstasdt ppattaagpl kaentntsks adsldlattt          450

spqnysetag nnnthhqdtg eesassgklg litntiagva glitggrrtr          500

revivnaqpk cnpnlhywtt qdegaaigla wipyfgpaae giyteglmhn          550

qdglicglrq lanettqalq iflrattelr tfsilnrkai dfllqrwggt          600

chilgpdcci ephdwtknit dridqiihdf vdktlpdqgd ndnwwtgwrq          650

wipagigvtg viiavialfc ickfvf
```

NSI signal sequence

[SEQ ID NO: 9]

DQGCAINFG

WNV TM2 domain

[SEQ ID NO: 10]

RSIAMTFLAVGGVLLFLSVNVHA junction NSI signal peptide Ebola glycoprotein

[SEQ ID NO: 11]

AINFGIPLGV junction Ebola glycoprotein-WNV TM2 domain

[SEQ ID NO: 12]

CKFVFRSIAM junction TM2 domain-NSI protein

[SEQ ID NO: 13]

VNVHADQGCA

---

The invention claimed is:

1. A polynucleotide comprising a sequence of a live, infectious, attenuated Flavivirus, the polynucleotide comprising:

a nucleotide sequence that encodes at least a part of a Filovirus glycoprotein lacking an N terminal signal peptide, wherein:

the nucleotide sequence is located at an intergenic region between an E gene of the Flavivirus and an NS1 gene of the Flavivirus, the E gene encoding an E protein, the NS1 gene encoding an NS1 protein, the NS1 protein comprising a signal peptide, such that a chimeric virus is expressed; and the nucleotide sequence is translatable such that the nucleotide sequence encodes a chimeric viral peptide, the chimeric viral peptide comprising:

(a) a further signal peptide, positioned C terminally of the E protein, the further signal peptide having the same sequence as the signal peptide of the NS1 protein, (b) the Filovirus glycoprotein, positioned C terminally of the further signal peptide, and (c) a TM domain of a further Flaviviral E protein, positioned C terminally of the Filovirus glycoprotein; and the chimeric viral peptide is positioned N terminally of the NS1 protein of the Flavivirus.

2. The polynucleotide according to claim 1, wherein the Flavivirus is Yellow Fever virus.

3. The polynucleotide according to claim 1, wherein the Filovirus is a mononegavirus.

4. The polynucleotide according to claim 3, wherein the Filovirus is an Ebola virus.

5. The polynucleotide according to claim 1, wherein the further signal peptide comprises the sequence set forth in SEQ ID NO:9.

6. The polynucleotide according to claim 1, wherein the TM domain of the further Flaviviral E protein is a TM2 domain from West Nile virus.

7. The polynucleotide according to claim 1, wherein the Filovirus glycoprotein lacks the N terminal signal sequence set forth in SEQ ID NO:6.

8. The polynucleotide according to claim 1, wherein the Filovirus glycoprotein lacks a mucin like domain set forth in SEQ ID NO:7.

9. The polynucleotide according to claim 1, further comprising a junction sequence, wherein the junction sequence is selected from the group consisting of:

the junction sequence set forth in SEQ ID NO:11, positioned between the further signal peptide and the Filovirus glycoprotein;

the junction sequence set forth in SEQ ID NO:12, positioned between the Filovirus glycoprotein and the TM domain; and the junction sequence set forth in SEQ ID NO:13, positioned between the TM domain and the NS1 protein.

10. The polynucleotide according to claim 1, wherein the nucleotide sequence comprises:

a nucleotide sequence that is 95% identical to the nucleotide sequence set forth in SEQ ID NO:1; or a nucleotide sequence that is 95% identical to the nucleotide sequence set forth in SEQ ID NO:3.

11. The polynucleotide according to claim 1, wherein the nucleotide sequence further comprises the nucleotide sequences encoding for the peptide sequences set forth in SEQ ID NO:11, SEQ ID NO:12 and SEQ ID NO:13.

12. A pharmaceutical composition comprising the polynucleotide sequence according to claim 1 and at least one pharmaceutically acceptable carrier, diluent, or excipient.

13. A method of vaccinating an individual against a Filovirus infection, the method comprising administering to the individual a polynucleotide sequence according to claim 1.

14. A chimeric live, infectious, attenuated Flavivirus comprising:

an E protein;

an NS1 protein comprising a signal peptide; and a chimeric protein comprising:

at least a part of a Filovirus glycoprotein lacking a functional signal peptide, wherein the Filovirus glycoprotein is inserted between the E protein and the NS1 protein;

a further signal peptide, positioned C terminally of the E protein, wherein the further signal peptide has the same sequence as the signal peptide of the NS1 protein, and wherein the Filovirus glycoprotein is positioned C terminally of the further signal peptide; and a TM domain of a further Flaviviral E protein, positioned C terminally of the Filovirus glycoprotein, wherein the chimeric peptide is positioned N terminally of the NS1 protein.

15. The chimeric live, infectious, attenuated Flavivirus according to claim 14, wherein said Filovirus is Ebolavirus.

16. The chimeric live, infectious, attenuated Flavivirus according to claim 14, wherein the Flavivirus is Yellow Fever virus.

17. The chimeric live, infectious, attenuated Flavivirus according to claim 14, wherein the Filovirus glycoprotein lacks the N terminal signal sequence set forth in SEQ ID NO:6.

18. A pharmaceutical composition comprising the chimeric live, infectious, attenuated Flavivirus according to claim 14 and at least one pharmaceutically acceptable carrier, diluent, or excipient.

19. A method of vaccinating an individual against a Filovirus infection, the method comprising administering to the individual the chimeric live, infectious, attenuated Flavivirus according to claim 14.

20. A chimeric live, infectious, attenuated Flavivirus according to claim 14, wherein the flavivirus comprises an amino acid sequence that is 95% identical to the amino acid sequence set forth in SEQ ID NO:2 or an amino acid sequence that is 95% identical to the amino acid sequence set forth in SEQ ID NO:4.

* * * * *